United States Patent
Ten-Jet-Foei

(10) Patent No.: US 10,173,503 B2
(45) Date of Patent: Jan. 8, 2019

(54) OPEN ROOF CONSTRUCTION FOR A VEHICLE AND ROLLO ASSEMBLY FOR USE THEREIN

(71) Applicant: Inalfa Roof Systems Group B.V., Oostrum (NL)

(72) Inventor: Suyanto Teri Wahiyu Ten-Jet-Foei, Helmond (NL)

(73) Assignee: INALFA ROOF SYSTEMS GROUP B.V. (NL)

( * ) Notice: Subject to any disclaimer, the term of this patent is extended or adjusted under 35 U.S.C. 154(b) by 0 days.

(21) Appl. No.: 15/640,054

(22) Filed: Jun. 30, 2017

(65) Prior Publication Data
US 2017/0297419 A1     Oct. 19, 2017

Related U.S. Application Data

(63) Continuation-in-part of application No. 15/202,380, filed on Jul. 5, 2016, and a continuation-in-part of
(Continued)

(30) Foreign Application Priority Data

Jul. 8, 2015   (EP) ..................................... 15175892

(51) Int. Cl.
*B60J 7/00*     (2006.01)
*B60J 1/20*     (2006.01)
(Continued)

(52) U.S. Cl.
CPC .......... *B60J 7/0015* (2013.01); *B60J 1/203* (2013.01); *B60J 1/2036* (2013.01); *B60J 1/2063* (2013.01);
(Continued)

(58) Field of Classification Search
CPC .............................. E06B 9/581; B60J 7/0015
(Continued)

(56) References Cited

U.S. PATENT DOCUMENTS

| | | | |
|---|---|---|---|
| 6,896,026 B2 * | 5/2005 | Martin ...................... | E06B 9/52 160/105 |
| 7,204,548 B2 * | 4/2007 | Wilms ..................... | B60J 7/043 296/214 |

(Continued)

FOREIGN PATENT DOCUMENTS

| | | | |
|---|---|---|---|
| CA | 2446648 A1 * | 1/2004 | ............... E06B 9/13 |
| DE | 10019787 A1 | 10/2001 | |

(Continued)

OTHER PUBLICATIONS

European Search Report and Written Opinion for related European patent application No. EP 15175692, dated Jan. 5, 2016.

*Primary Examiner* — Dennis H Pedder
(74) *Attorney, Agent, or Firm* — Steven M. Koehler; Westman, Champlin & Koehler, P.A.

(57) ABSTRACT

An open roof construction for a vehicle comprises a rollo assembly. The rollo assembly comprises a rollo screen and a winding shaft for the rollo screen which is rotatable around a stationary axis of rotation. The rollo screen firstly extends in a first direction, next around a reversal member and finally back in an opposite second direction and ends at a rollo screen edge which is attached to a stationary member. The rollo screen has two longitudinal edges which, when the rollo screen is wound off, are brought into engagement with holding members. The longitudinal edges of the rollo screen each comprise a hooking member insertable into a holding groove and hook behind a narrow entrance thereof. A reversal member is provided with a device acting on at least
(Continued)

one of the hooking member and holding groove to enable the hooking member to enter and exit the holding groove.

22 Claims, 26 Drawing Sheets

Related U.S. Application Data application No. PCT/EP2016/062270, filed on May 31, 2016.

(51) Int. Cl.
*B60J 7/06* (2006.01)
*E06B 9/58* (2006.01)

(52) U.S. Cl.
CPC ............. *B60J 1/2075* (2013.01); *B60J 7/067* (2013.01); *E06B 9/581* (2013.01)

(58) Field of Classification Search
USPC ........................................ 296/214; 160/273.1
See application file for complete search history.

(56) References Cited

U.S. PATENT DOCUMENTS

| | | | |
|---|---|---|---|
| 7,287,811 B2* | 10/2007 | Sanders | ................ B60J 7/0015 160/265 |
| 7,798,568 B2 | 9/2010 | Keller | |
| 7,967,052 B2 | 6/2011 | Lin | |
| 8,419,119 B2 | 4/2013 | Nakamura | |
| 9,834,985 B2* | 12/2017 | Storen | .................... E06B 9/581 |
| 2005/0189794 A1 | 9/2005 | Grimm | |
| 2006/0027347 A1* | 2/2006 | Boehm | ................. B60J 7/0015 160/273.1 |
| 2008/0252105 A1 | 10/2008 | Jansen | |
| 2009/0178771 A1* | 7/2009 | Lin | ........................ B60J 7/0015 160/370.22 |

FOREIGN PATENT DOCUMENTS

| | | |
|---|---|---|
| DE | 102009033885 A1 | 1/2011 |
| EP | 1495888 A | 1/2005 |
| EP | 1712389 A1 | 10/2006 |
| EP | 1908616 A | 4/2008 |
| EP | 1553259 A | 7/2009 |
| JP | 2001055046 A | 2/2001 |
| WO | 2010022768 A1 | 3/2010 |

* cited by examiner

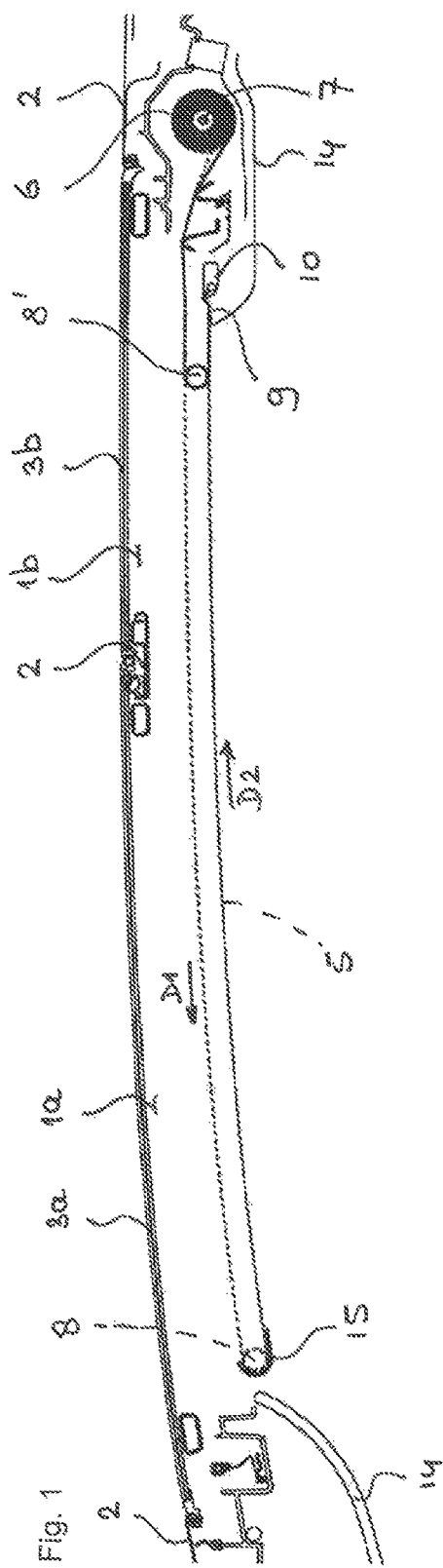

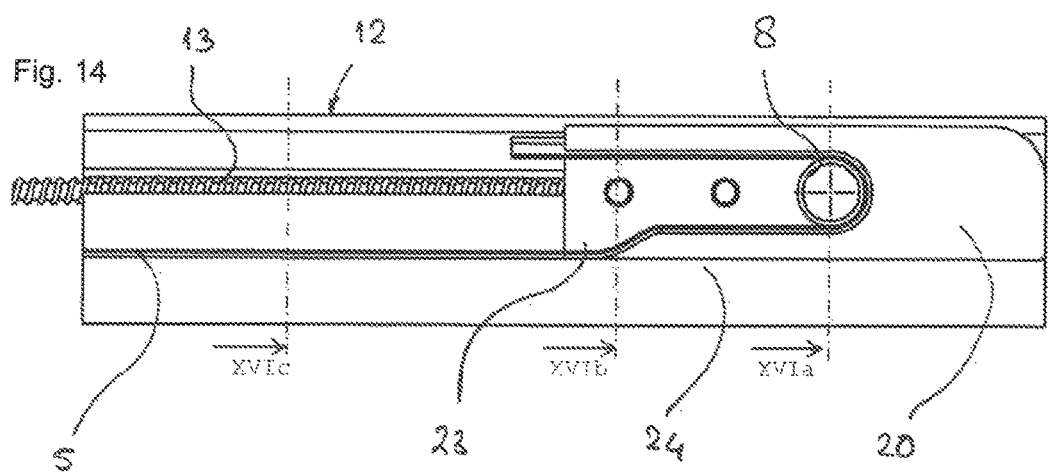

Fig. 17
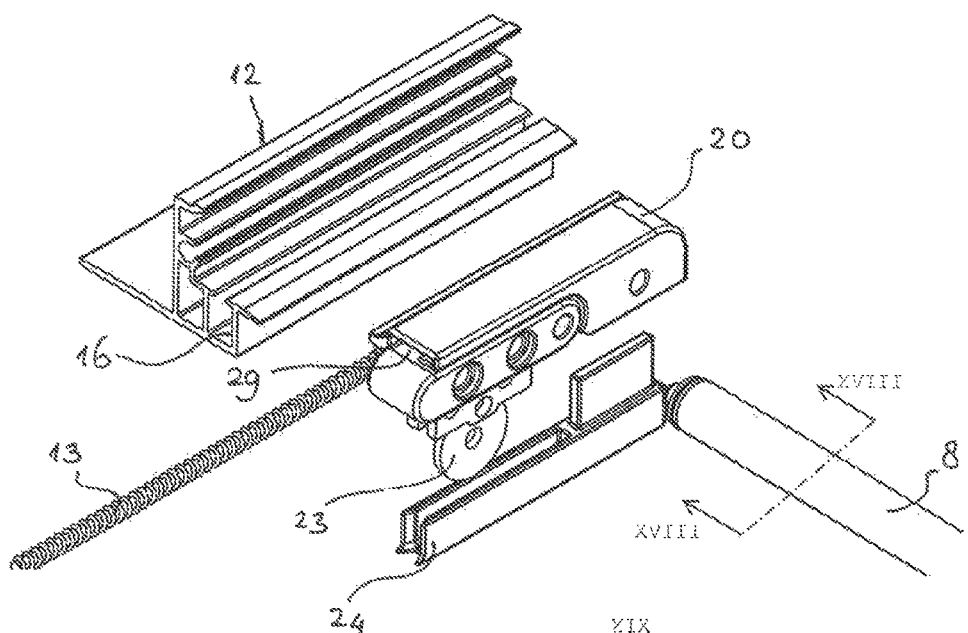
Fig. 18
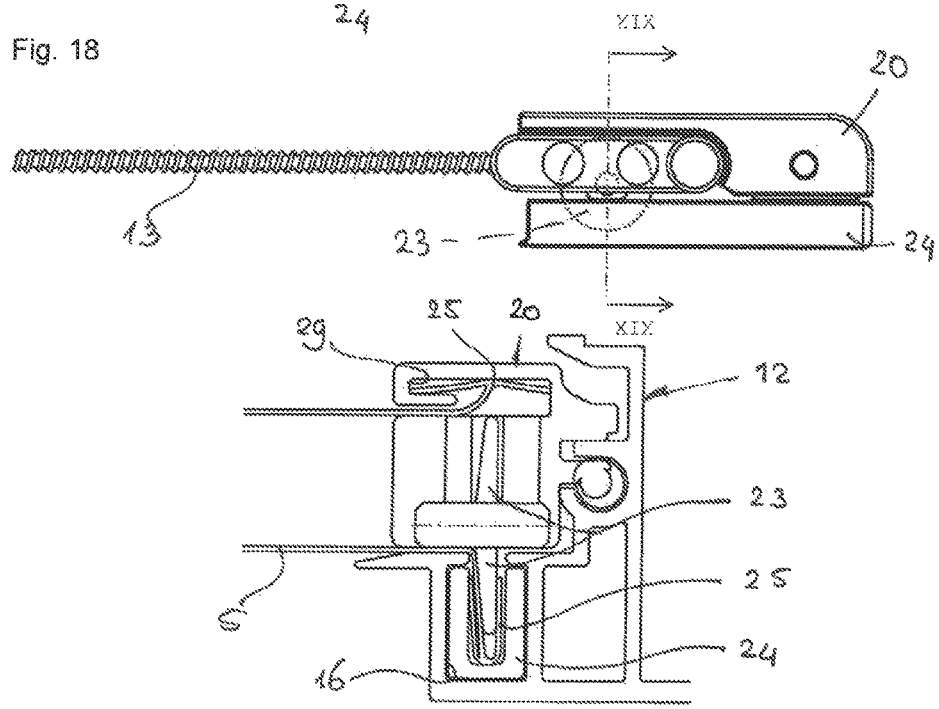
Fig. 19

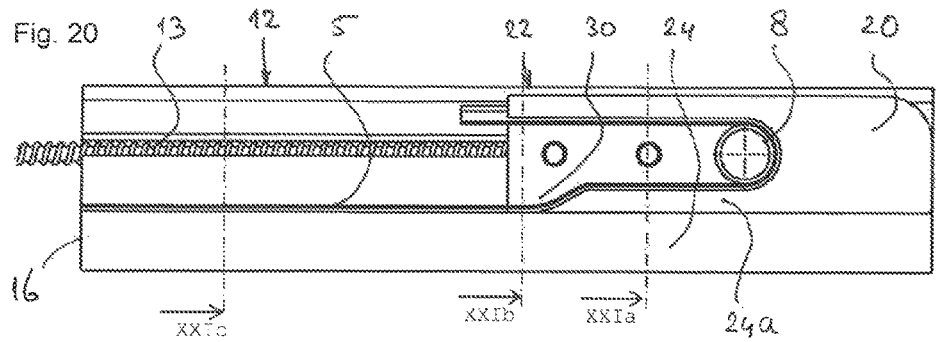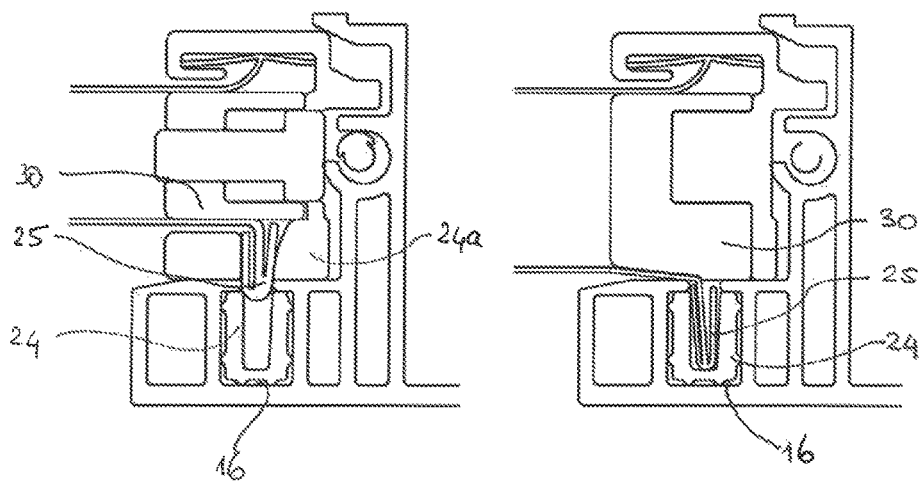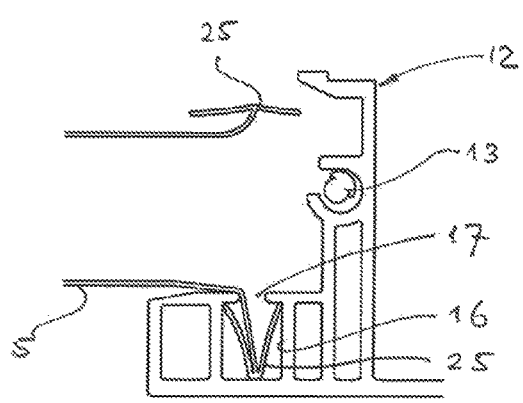

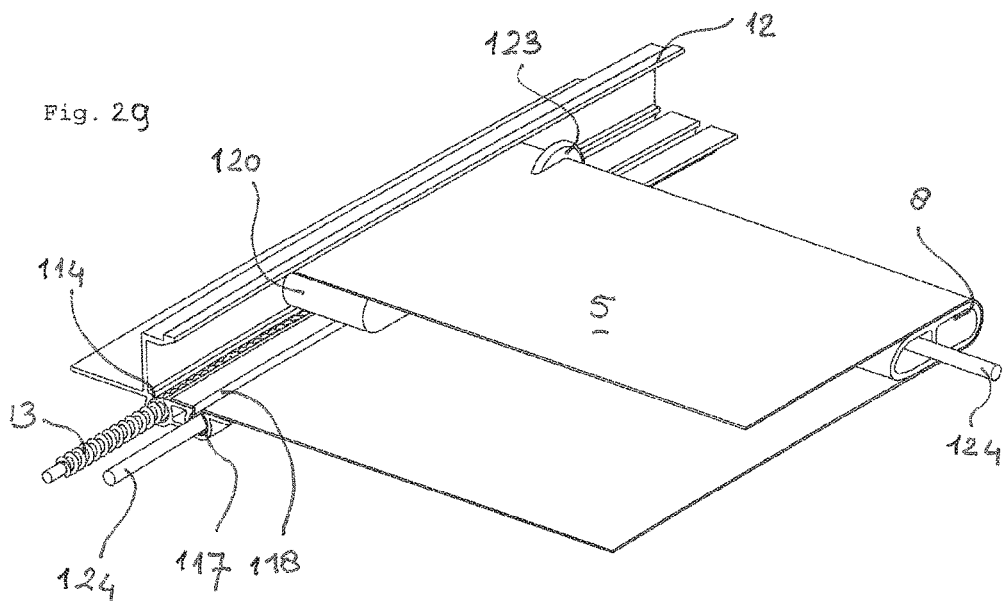
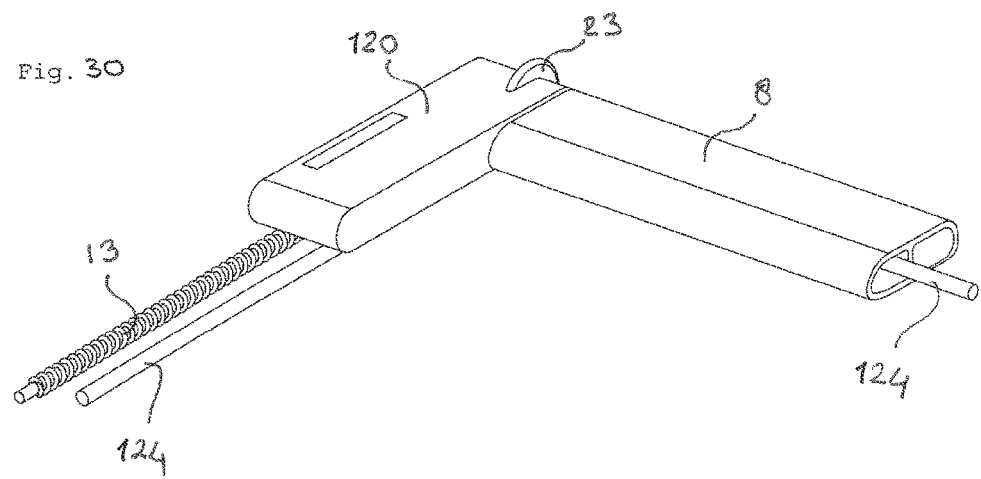

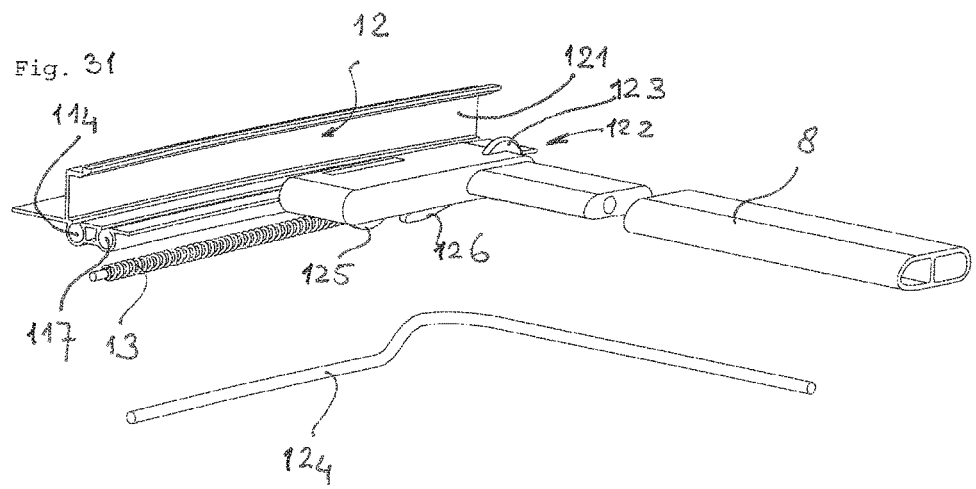
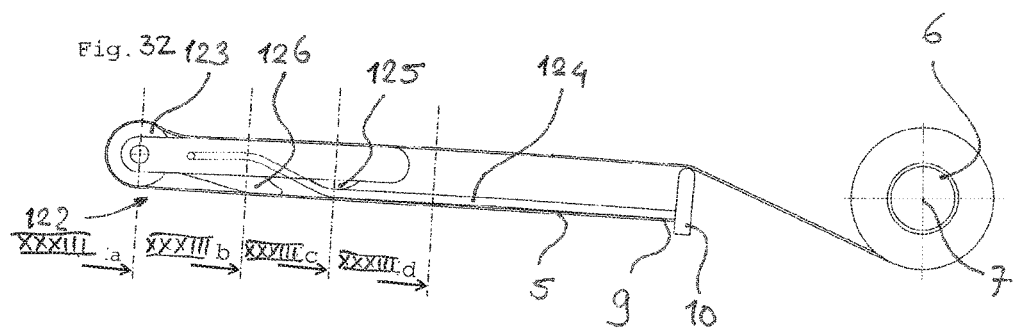

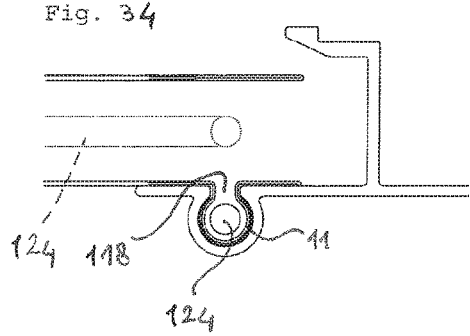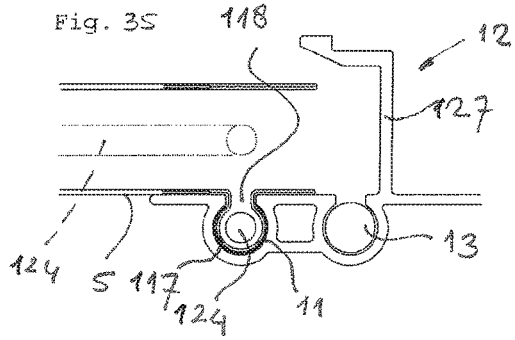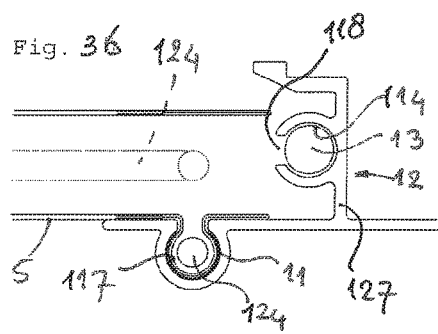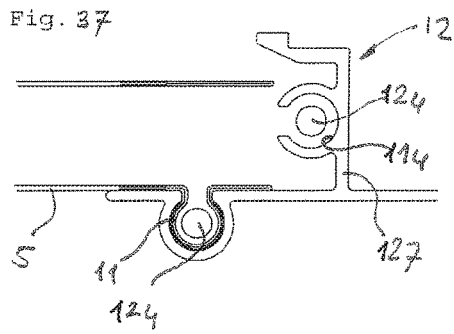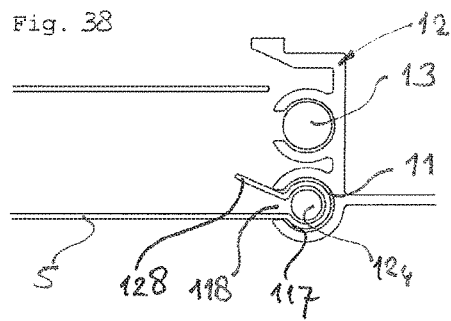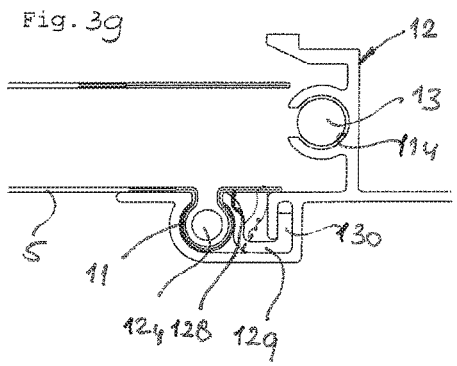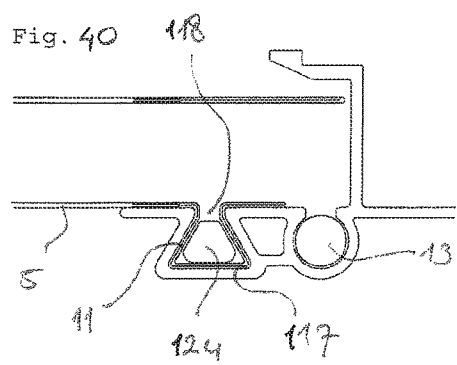

OPEN ROOF CONSTRUCTION FOR A VEHICLE AND ROLLO ASSEMBLY FOR USE THEREIN

BACKGROUND

The discussion below is merely provided for general background information and is not intended to be used as an aid in determining the scope of the claimed subject matter.

Aspects of the invention relate to an open roof construction having a sunscreen comprising a visible portion and a non-visible portion above it. The visible portion is stationary with respect to the sides of the roof opening and the non-visible portion can be unwound at one end and reversed into the visible portion on the opposite end. Thus, the visible portion is stationary, but the length of it varies to open and close the rollo screen. Because of such a stationary position of the rollo screen edge of the visible portion, any connections there also have a stationary position to the stationary part of the open roof construction. This has a positive effect on the life span and reliability of these connections, while allowing to simplify the design of these connections.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they in-tended to be used as an aid in determining the scope of the claimed subject matter. The claimed subject matter is not limited to implementations that solve any or all disadvantages noted in the Back-ground.

An open roof construction for a vehicle having a roof opening in a stationary roof part includes a rollo assembly positioned below said roof opening intended for covering the roof opening. The rollo assembly comprises a rollo screen and a winding shaft. The rollo screen includes a rollo screen edge which is attached to a stationary member of the open roof construction. The opposite edge is formed by an operating beam which is movable parallel to the roof opening in first and second directions in correspondence with the amount of rollo screen being wound on or off said winding shaft. The rollo screen has two longitudinal edges which, when the rollo screen is wound off, are brought into engagement with holding members extending alongside the longitudinal edges of the roof opening. The holding members each comprise a least a holding groove having a narrow entrance. The longitudinal edges of the rollo screen each comprise a hooking member which is insertable into the holding groove and hooks behind the narrow entrance thereof. The operating beam is provided with a device acting on at least one of the hooking member and holding groove to enable the hooking member to enter and exit the holding groove.

In this manner, the edges of the sunscreen are reliably held on the one hand and are easily inserted into and removed from the holding groove on the other hand.

In one embodiment, the winding shaft for the rollo screen is rotatable around a stationary axis of rotation, and wherein the rollo screen, starting from the winding shaft, firstly extends in a first direction D1, next around a reversal member at the position of the operating beam and finally back in an opposite second direction D2 and ends at the rollo screen edge which is attached to a stationary member of the open roof construction.

This embodiment has the advantage that the winding shaft, which is relatively bulky, is stationary, so it is not necessary to reserve room for it along the whole length of the sunscreen.

Each hooking member may be resiliently compressible so as to be insertable into the holding groove through the narrow entrance and expandable once within the holding groove, the operating beam being provided with a compression element compressing the hooking member when the rollo screen is wound on to enable the hooking member to leave the holding groove.

In this way, the hooking member can change its shape with the assistance of the displacing element to enable entering and exiting the holding groove.

To facilitate the entrance of the hooking member into the holding groove, the operating beam is provided with a pushing member to push the hooking member into the holding groove when the operating beam is moved to unwind the rollo screen. The hooking member will change its shape as a result of the pushing member pushing the compressible and expandable hooking member through the narrow entrance of the holding groove.

The pushing member may comprise a knife-shaped element which extends into the holding groove. Due to the knife shape, it will fit through the narrow entrance of the holding groove and thus the pushing action can be continued into the holding groove to further improve the reliability of the pushing-in action.

If the knife-shaped element is circular and rotatable, the sliding movements between the knife-shaped element and the hooking member will be minimized to minimize the wear of the hooking member.

The hooking member includes a sharp inward corner facing the narrow entrance opening, the knife-shaped element engaging the corner when it pushes the hooking member into the holding groove.

The sharp inward corner provides a reliable position for the pushing member to exert pushing forces.

In another embodiment, the pushing member remains outside the holding groove and the hooking member will then be made rigidly enough to be pushed from outside the holding groove.

In one embodiment, the narrow opening of the holding groove is on the upper side thereof.

The advantage of this position of the holding groove is that the tension forces from the rollo screen on the hooking member is at an angle to the outward movement of the hooking member, so that it is almost impossible for the rollo screen to pull the hooking member from the holding groove.

In another embodiment, the narrow opening of the holding groove is on the lateral side thereof facing the opposite holding groove.

Such position of the holding groove results in a minimal building height.

To improve the holding action of the hooking member, for both embodiments of the holding groove, the hooking member is arrow shaped.

The arrow shaped member may then hook on both sides of the holding groove (with a fitting arrangement of the holding groove).

In another embodiment, to minimize the winding thickness of the sunscreen edges on the winding shaft, the hooking member is formed of a rigid strip folded away from the edge of the rollo screen.

In that case, the operating beam may be provided with a locking member arranged within the holding groove on the side of the rollo screen facing away from the rigid strip in order to push the rollo screen and the rigid strip toward a side of the holding groove such that the rigid strip is hooking behind a rib defining one side of the narrow entrance.

The locking member keeps the rigid strip of the hooking member in engagement with the rib, thus improving the reliability of the hooking action.

The locking member may be a translucent rod-shaped member which is visible through the narrow entrance of the holding groove and which is lighted by a light source, which is either stationary lighting the rod-shaped member from the side, or is movable with the rod-shaped member and lighting it from the end.

The locking member may thus have more than one function. It can even have a further function if it replaces a drive cable for the sunscreen engaging the operating beam. The rod-shaped member forming the locking member will generally have to be bendable if space requires so and in case it moves with the operating beam and should extend along the whole (visible portion of the) sunscreen when it is unwound. Alternatively, the rod-shaped member may be stationary and compressible or movable in a direction perpendicular to length of the rod-shaped member to allow the displacing element to pass.

In a further embodiment, the entrance opening of the holding groove may be more narrow than the holding groove, such that the locking member is locked within the holding groove when the locking member and the edge area of the rollo screen are inserted in the holding groove. This is an easy way to hold the locking member and therefore the edge area of the rollo screen in the holding groove.

In an embodiment, the operating beam is provided with a displacing device acting on at least one of the locking member and holding groove to enable the locking member to enter and exit the holding groove together with the edge area of the rollo screen, wherein at least one of the edge area of the rollo screen, the locking member and the holding groove may be resiliently deformable to enable the locking member to enter and exit the holding groove.

The elastic deformation force, which may thus be provided either by the edge area of the rollo screen, the locking member and/or the holding groove, generally together with friction forces is sufficient to hold the edge area of the rollo screen in a reliable manner.

Each longitudinal edge area may extend into the holding groove through the entrance opening, around the locking member and then out of the holding groove again.

To provide a further means to hold the edge area of the rollo screen, a stop member may be provided at or near the longitudinal edges of the rollo screen and may be adapted to cooperate with the locking member to ensure the rollo screen remains locked in the holding groove.

In one embodiment the elongated locking member is stationary in longitudinal direction with respect to the holding groove, wherein the operating beam is adapted to accommodate the locking member when it exits the holding groove in case the operating beam is moved to wind the rollo screen on the winding shaft.

Thus, when the elongated locking member is out of use, it can be accommodated in the operating beam such that it is not visible and still under control.

In another embodiment in which the elongated locking member is stationary in longitudinal direction with respect to the holding groove, the stationary part is provided with an accommodating groove parallel to the holding groove to accommodate the locking member when it exits the holding groove in case the operating beam is moved to wind the rollo screen on the winding shaft.

In still another embodiment in which the elongated locking member is stationary in longitudinal direction with respect to the holding groove, either the operating beam or the stationary part is provided with a winding pulley to accommodate the locking member when it exits the holding groove in case the operating beam is moved to wind the rollo screen on the winding shaft.

In said embodiment in which the locking member is stationary in longitudinal direction with respect to the holding groove, but is movably attached to the stationary part next to the respective holding groove so as to be movable between a position within the holding groove and a position next to the holding groove, the operating beam or a part moving with it being provided with a displacing device acting on the locking member to move it between both positions when the operating beam is moved to wind or unwind the rollo screen.

The operating beam may be provided with a member to hold the respective longitudinal edge of the rollo screen when the edge area is pushed into the holding groove. Such member ensures that the rollo screen is stretched from the inside when it is urged into the holding groove.

The holding member of the operating beam may be a cam clamping the rollo screen positioned laterally outside the holding groove, which is a very simple means.

The longitudinal edges of the rollo screen may also each be provided with a stop member to keep the respective longitudinal edge of the rollo screen substantially stationary in lateral direction when the edge area is pushed into the holding groove. This stop member may at least be one of a strip, cable and/or edge reinforcement.

In another embodiment, the stop member is positioned substantially within the edge area and includes two spaced strips such that they are positioned in the holding groove with the locking member between them.

Said locking member may be an elongated element which may be constructed as a solid steel or a twisted steel cable or wire, or a rod made of rubber-like material or plastic, such as nylon or PMMA. This depends for example whether it must be elastically deformable or not.

The locking member may for example be of circular or trapezium-shaped cross section.

If the entrance opening of the holding groove is on the upper side thereof, and thus the rollo screen will be stretched at substantially 90 degrees, it is easier to hold the edge area of the rollo screen into the holding groove, than if the entrance opening is at the lateral side thereof.

If it is the holding groove that is elastically deformable, the holding groove may be at least partly defined by a flexible free standing groove wall which is configured to bend when the locking member is entering or exiting the holding groove.

An aspect of the invention further relates to a rollo assembly intended for use in an open roof construction according to the present invention.

BRIEF DESCRIPTION OF THE DRAWINGS

Hereinafter aspects of the invention will be elucidated while referring to the drawings, in which:

FIG. 1 is a longitudinal sectional view of an open roof construction.

FIGS. 12-16c are views similar to those of FIGS. 3-7c, but showing an alternative embodiment.

FIG. 17 is an exploded view similar to that of FIG. 15a, but showing another embodiment.

FIG. 18 is a cross sectional view along the line XVIII-XVIII in FIG. 17.

FIG. 19 is a cross-sectional view along the line XIX-XIX in FIG. 18.

FIG. 20 is a view similar to that of FIG. 14, but showing a further embodiment.

FIGS. 21a-21c are cross-sectional views along the lines XXIa-XXIa, XXIb-XXIb and XXIc-XXIc, respectively in FIG. 20.

FIGS. 22a, 22b-24a, 24b are cross-sectional views of the guide illustrating how different embodiments of the hooking member are introduced into the holding groove by the knife-shaped element.

FIGS. 25a, 25b-28a, 28b illustrate two positions of different embodiments of the hooking member before and after introduction into the holding groove.

FIG. 29 is a perspective view of a further embodiment from the rear, showing a part of the rollo screen near an end of the operating beam and an end of the stationary guide.

FIG. 30 is a view similar to that of FIG. 29, but without the rollo screen and guide.

FIG. 31 is a view substantially similar to that of FIG. 29, but without the rollo screen and with the cable and locking member shown separately FIG. 32 is an enlarged cross-sectional view along the line XXXII-XXXII in FIG. 2b.

FIGS. 34-40 are views corresponding to that of FIG. 33d, but showing different embodiments.

FIGS. 47, 48 are views corresponding to that of FIG. 2, but shown from a different angle, while FIG. 48 shows a slightly changed embodiment.

FIGS. 49-53a, 53b are views similar to that of FIG. 30 and showing embodiments in which the edge area of the rollo screen are configured differently.

DETAILED DESCRIPTION OF THE ILLUSTRATIVE EMBODIMENTS

Figure 2A:
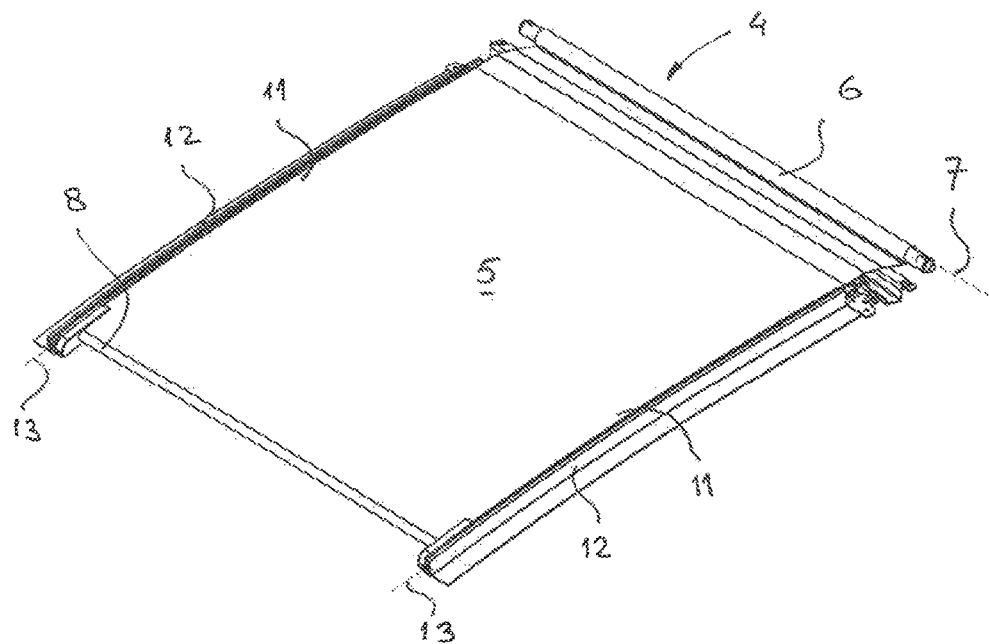
FIGS. 2a and 2b are perspective views of the rollo assembly of the open roof construction of FIG. 1 in a closed and open position, respectively.
Figure 2B:
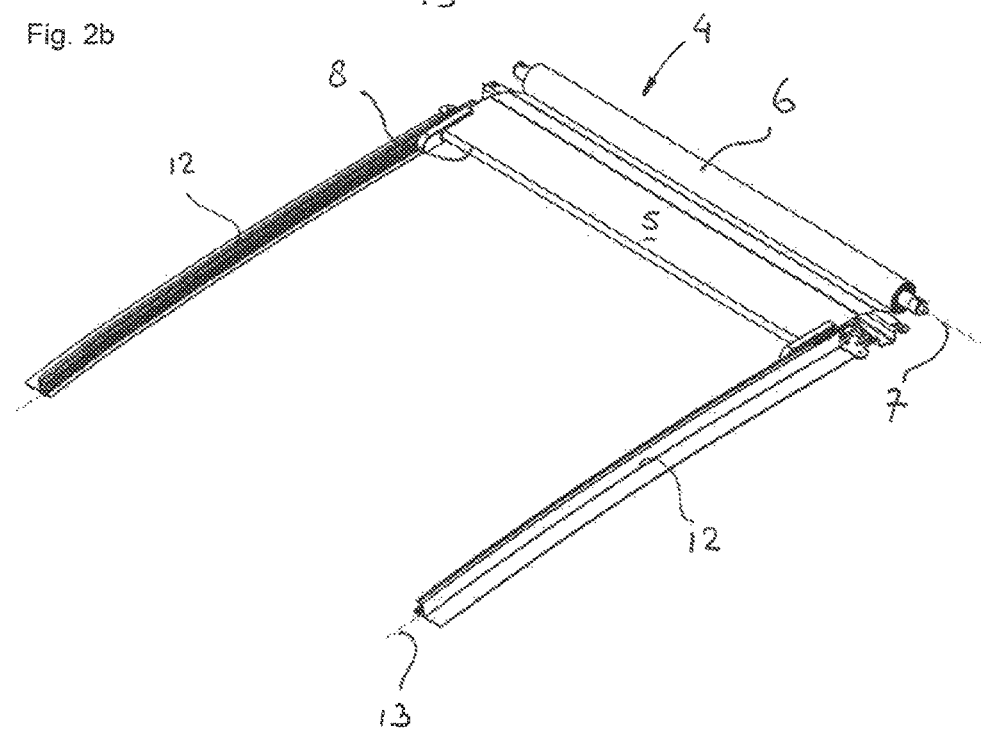
Figure 3:
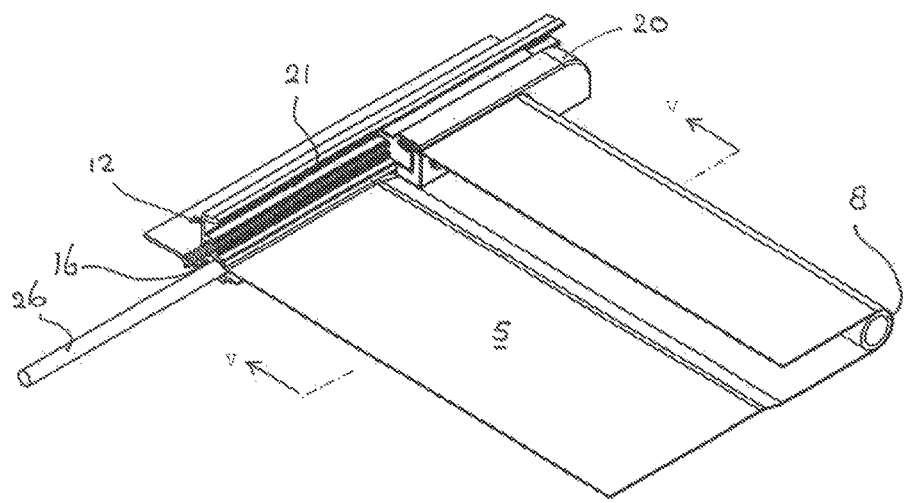
FIG. 3 is a perspective view from the rear, showing a part of the rollo screen near an end of the operating beam and an end of the stationary guide.
Figure 4:
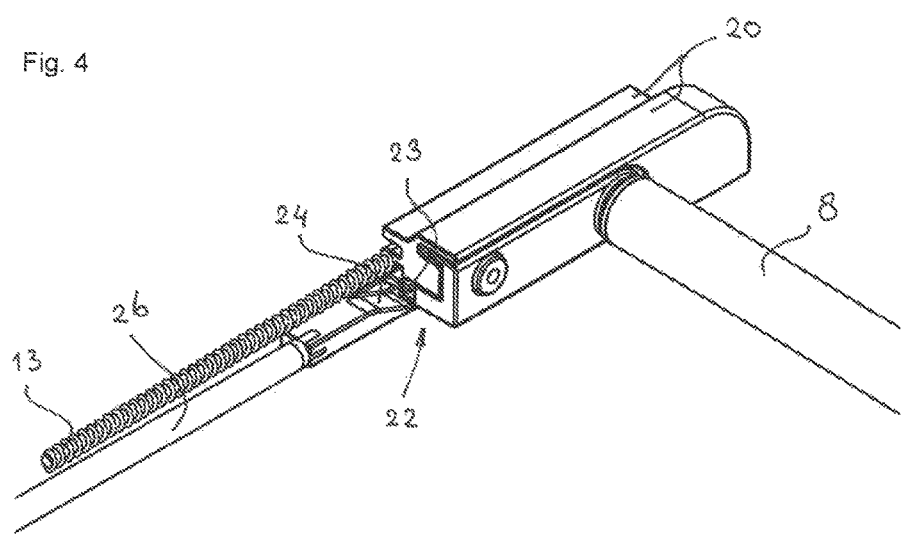
FIG. 4 is an enlarged view of FIG. 3, but without the rollo screen and guide.
Figure 5:
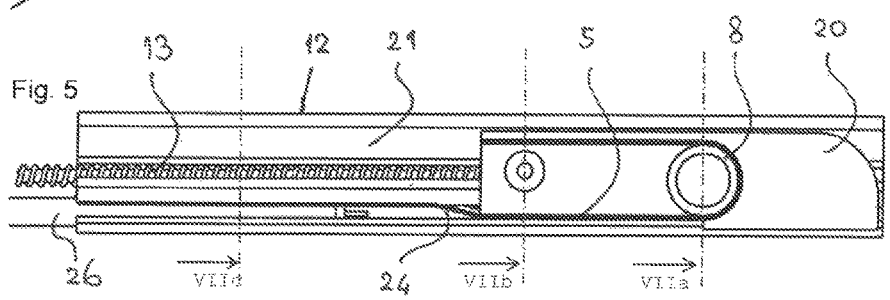
FIG. 5 is a cross-sectional view along the line V-V in FIG. 3.

Referring firstly to FIGS. 1 and 2, an open roof construction for a vehicle is illustrated. It comprises a roof opening 1 in a stationary roof part 2 which can be closed by a movable roof closure. Here, there is in fact a front roof opening 1a and a rear roof opening 1b, closable by a rigid transparent front panel 3a and a rigid transparent rear panel 3b. As is known in the respective field, such roof panel or panels 3 may be operated (by slides, levers and drives not illustrated but generally known) for opening and closing the roof opening 1. One of the panels 3, normally the rear panel 3b, may also be fixed.

A rollo assembly 4, here acting as a sunscreen assembly, is positioned below said roof opening 1 (although it is noted that parts of such a rollo assembly 4 also may be located below the stationary roof part 2). The rollo assembly 4 comprises a rollo screen 5 and a winding shaft 6 for the rollo screen 5 which is rotatable around a stationary axis of rotation 7. The rollo screen 5, starting from the winding shaft 6, firstly extends substantially in a first direction D1, next around a reversal member 8 and finally back in an opposite second direction D2 and ends at a rollo screen edge 9 which is attached to a stationary member 10 of the open roof construction.

The reversal member 8 is movable in parallel to said first and second directions D1, D2 in correspondence with the amount of rollo screen 5 being wound on or off said winding shaft 6. For achieving the required translational movement of the reversal member 8 it has two opposite ends and the rollo screen 5 has two longitudinal edges 11 (FIG. 2) guided in two opposite guides 12 extending in parallel to said first and second directions D1,D2 (generally the lengthwise direction of the vehicle) at opposite side edges of the roof opening 1. Two drive cables 13 (which are part of a drive mechanism) are provided engaging said opposite ends 11 of the reversal member 8. The drive cables 13 may run in cable channels (not illustrated here) provided in the guides 12. The position of the reversal member 8 and thus of the rollo screen 5 is controlled by the drive cables 13. In FIG. 1 the reversal member 8 (and thus the rollo screen 5) has been illustrated in two different positions: in solid lines a position 8' in which the rollo screen 5 is in a position substantially fully opening the roof opening 1 (see also FIG. 2a) and at least partially hidden by a headlining 14 and with dashed lines a fully closed position 8 (see also FIG. 2b). Thus, the lower, visible portion of the rollo screen 5 is stationary, only the length thereof varies due to the movement of the reversal member 8.

It is possible that the winding shaft 6 is provided with a spring member (such as an internal coiled spring) biasing the winding shaft 6 in a direction for winding the rollo screen 5. As a result the rollo screen is always kept taut, irrespective the position of the reversal member 8.

In the illustrated embodiment the reversal member 8 comprises a rotatable cylindrical member which will rotate in accordance with the rollo screen 5 moving around it when the reversal member 8 is displaced. As an alternative (not illustrated) the reversal member may comprise a non-rotating member providing or defining a low friction surface intended for engaging and guiding the rollo screen 5.

The reversal member 8 further may be provided with a cover member 15 which hides the part of the rollo screen 5 extending around the reversal member 8 from view.

The guides 12 are used for supporting the rollo screen 5 and keeping it in a desired position. FIGS. 3-7 show the cooperation between one of the guides 12 and the sunscreen 5 in one embodiment. The guide 12 comprises a holding groove 16 having a narrow entrance opening 17 formed by a lower and upper rib 18, 19 (see in particular FIG. 7). The entrance opening 17 is directed horizontally towards the opposed holding groove 16 of the other guide 12. The reversal member 8 and the cover member 15 (not shown here) form the operating beam for the sunscreen 5. At each end of the operating beam, there is provided a slider 20 to which the drive cable is attached. The slider 20 is guided by one or more guide grooves 21 in the guide 12. Rollo screen displacing device 22 are attached to the slider 20. They comprise a knife-shaped element 23 and a compressing element 24. These elements 23, 24 are used to insert and remove a hooking member 25 at each the longitudinal edge 11 of the rollo screen 5 into and out of the holding groove 16. In this embodiment, the hooking member 25 is formed by a rigid strip folded away from the edge of the rollo screen 5. Such strip is known per se. In the embodiment shown, the strip of the hooking member 25 is folded in upward direction. The adjacent edge 11 of the rollo screen 5 may also be formed from more rigid, for example plastic, material, so that the hooking member 25 includes a sharp inward corner 25a in which the knife-shaped element 23 may engage. The hooking member 25 is resiliently compressible so as to enter the holding groove 16 through the narrow opening 17 and expandable once in the holding groove 16.

Figure 6A:
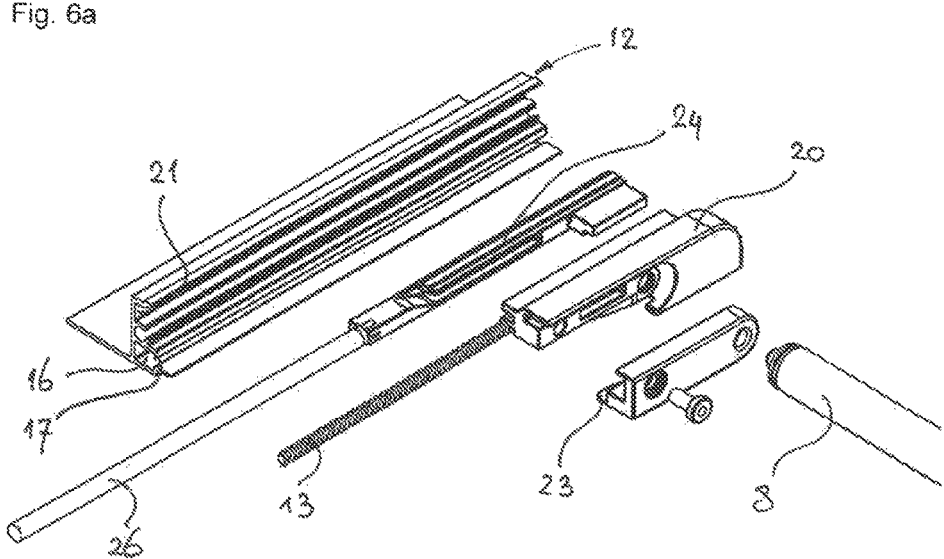
FIG. 6a is an exploded version of the view of FIG. 3.
Figure 6B:
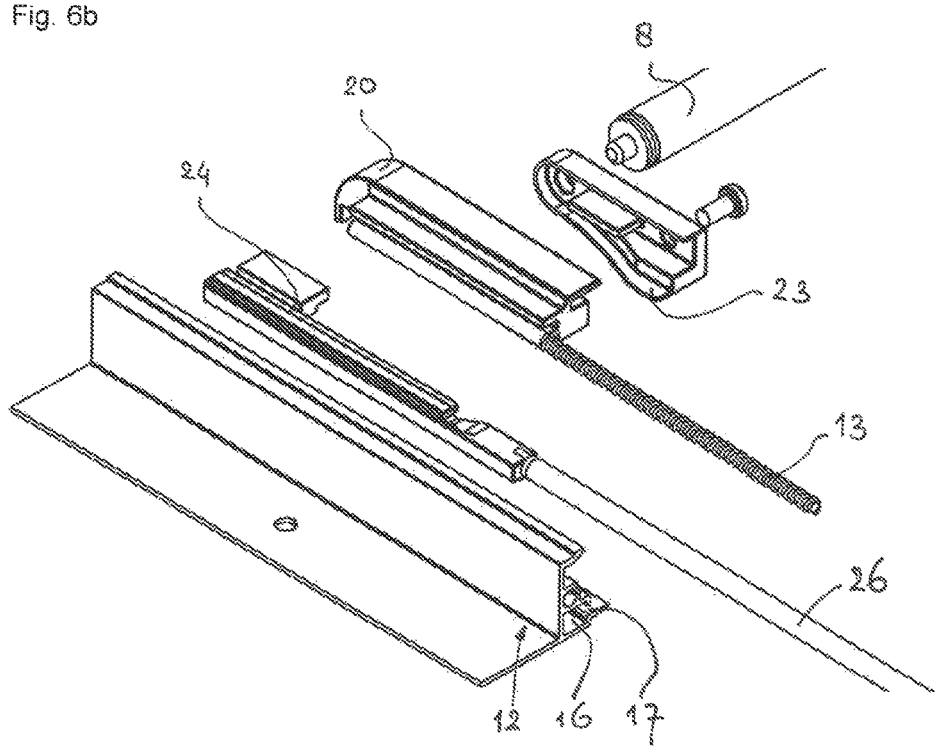
FIG. 6b is an exploded view of the parts of FIG. 6a, but as seen from outside the guide.
Figure 7A:
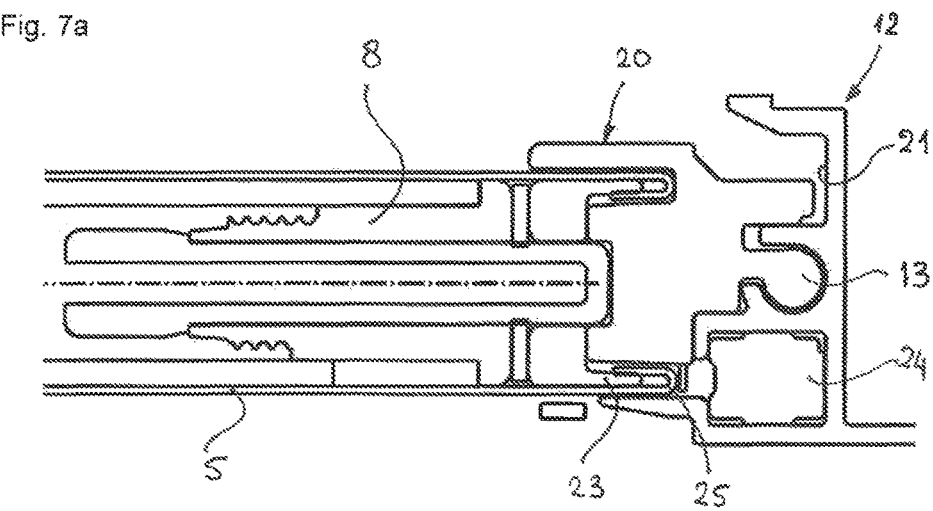
FIGS. 7a, 7b, 7c are cross-sectional views along the lines VIIa, VIIb, VIIc in FIG. 5.
Figure 7B:
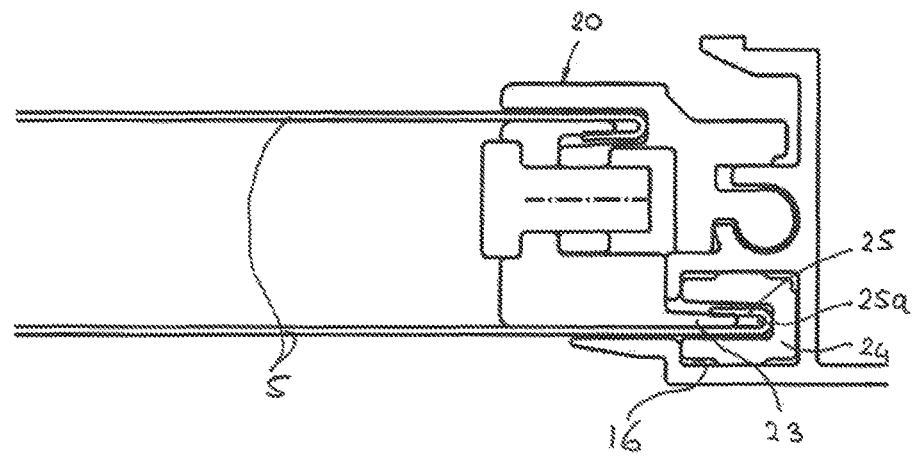
Figure 7C:
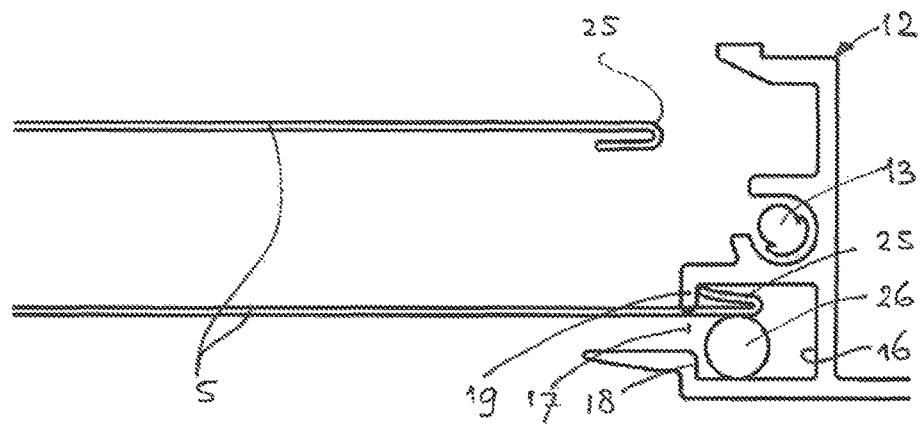

FIG. 6b and the cross-sections of FIGS. 7a-7c show that the knife-shaped element 23 has a varying extent in lateral direction when seen in longitudinally different cross-sections. In the cross section of FIG. 7a close to the reversal member 8 the lateral extent is such that it remains outside the holding groove 16. In a direction away from the reversal member 8, the knife-shaped element 23 gradually extends into the holding groove 16, such that when the knife-shaped element moves along the edge 11 of the rollo screen 5, the strip 25 and the adjacent edge 11 of the rollo screen 5 are stretched outwardly into the holding groove 16. In FIG. 7b it has completely entered the holding groove 16, but it is inside the compressing element 24, so that it cannot expand. At the third cross section according to FIG. 7c the strip 25 has moved out of the compressing element 24 (which has first moved the hooking element 25 in upward direction) and has hooked behind the upper rib 19 bordering the narrow entrance opening 17 of the holding groove 16. The rollo screen 5 now remains stretched between the guides 12.

To assist in maintaining the engagement of the hooking member 25 and the rib 19 a locking rod 26, here attached to the compressing element 24 of the slider 20 and positioned below the hooking member 25, engages the hooking member 25 from below and keeps it at a height that the hooking member 25 cannot escape from the holding groove 16 through the narrow entrance opening 17.

When the winding shaft 6 of the rollo screen 5 rotates to wind it, the reversal member 8 moves in opposite direction and the compressing element 24 moves with it. The hooking member 25 arrives from the position of FIG. 7c in the position of FIG. 7b where it is compressed and moved vertically by the compressing element 24 to a position aligned with the narrow entrance opening 17. Thus, when the knife-shaped element 23 moves back along the rollo screen 5, the stretching force of the rollo screen 5 urges the hooking member 25 to follow the knife-shaped element 23 inwardly and out of the holding groove 16 as is shown in FIG. 7b.

Figure 8A:
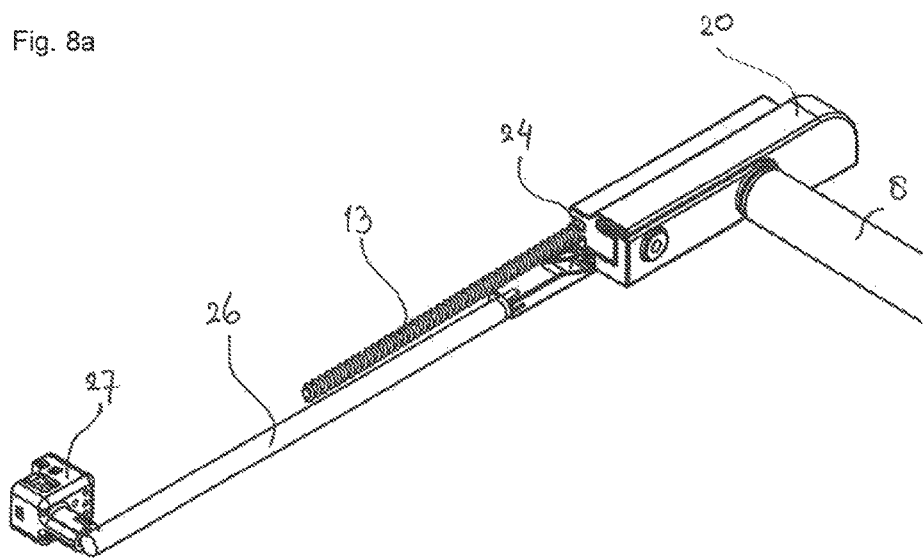
FIGS. 8a, 8b are views similar to that of FIG. 4, but showing alternative arrangements with a light source.
Figure 8B:
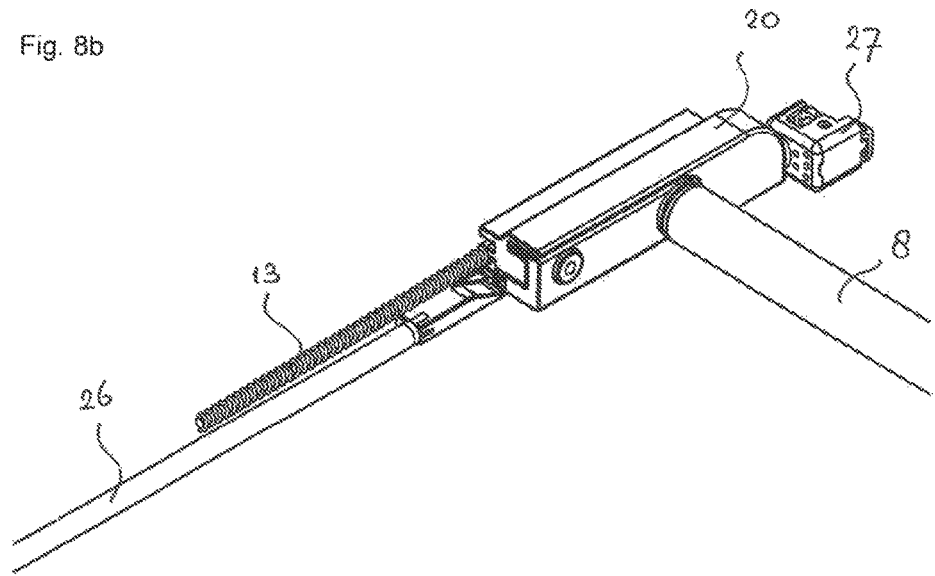

In the embodiment of FIGS. 4-7, the locking rod 26 moves with the reversal member 8. If it is at least partly transparent, this locking rod 26 may also function as light emitting rod, emitting light through the narrow entrance opening 17 of the holding groove 16 to the interior of the vehicle. A light source 27 (e.g. a LED) may be stationary in a position where the locking rod 26 moves in front of the light source (FIG. 8a) or be movable as well. FIG. 8b shows that the light source 27 is attached to the slider 20 or displacing device 22. The light is then transmitted through the slider 20 and/or displacing device 22 to the light emitting locking rod 26. The light source may also be arranged on the other end of the locking rod 26. The light source 27 may be switched on and off, for example switched on if the rollo screen 5 is fully closed or fully opened. In the embodiment where the light source is movable, the switch could be on the light source 27 itself. If necessary, measures should be taken to distribute the light along the length of the locking rod 26, especially if the light source 27 is arranged alongside the locking rod.

Figure 9A:
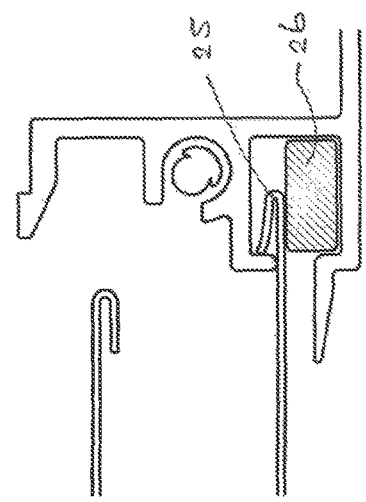
FIGS. 9a, 9b and 10a, 10b are cross-sectional views corresponding to that of FIGS. 7c, and 7b, respectively, but showing alternative embodiments.
Figure 9B:
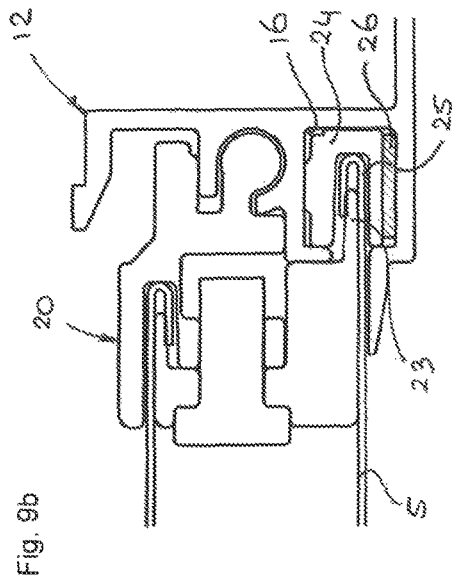

In the alternative embodiment of FIG. 9a, 9b, the locking rod 26 is stationary in longitudinal direction. In order to allow the compressing element 24 to pass the locking rod 26, it is made of a compressible material, such as static foam. In FIG. 9a the locking rod 26 is in its locking position keeping the hooking member 25 in a high position within the holding groove 16. In FIG. 9b, the locking rod 26 is locally compressed downwardly by the compressing element 24, so that it may move with respect to the locking rod 26 without requiring additional cross sectional space in the holding groove 16.

Figure 10A:
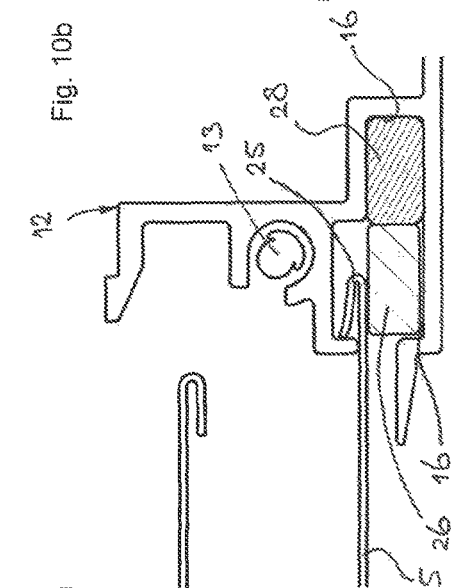
Figure 10B:
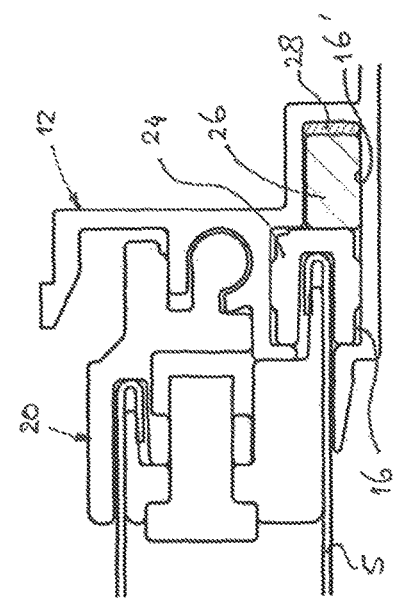

In the embodiment of FIG. 10a, 10b the locking rod 26 itself is not compressible, but an additional element 28, for example made of static foam or another spring member, is in this case provided in a lateral extension 16' of the holding groove 16 and is compressible to allow the locking rod 26 to enter the lateral extension 16' when the compressing element 24 has to pass the locking rod 26.

Figure 11A:
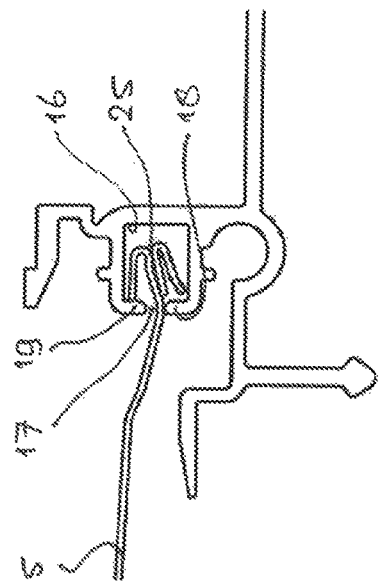
FIGS. 11a-11d are views similar to that of FIG. 7c, but showing four other arrangements of the hooking member and holding groove combination.
Figure 11B:
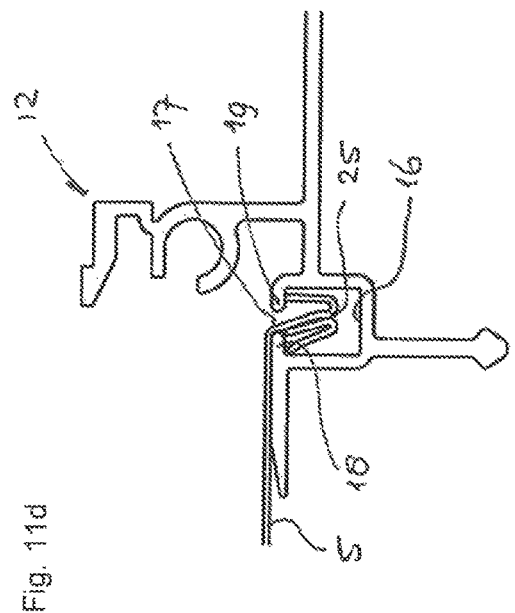
Figure 11C:
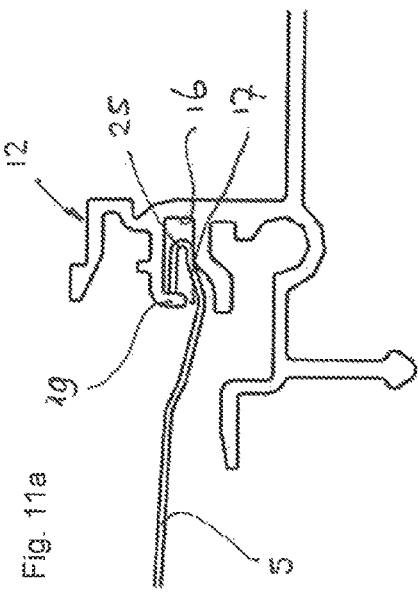
Figure 11D:
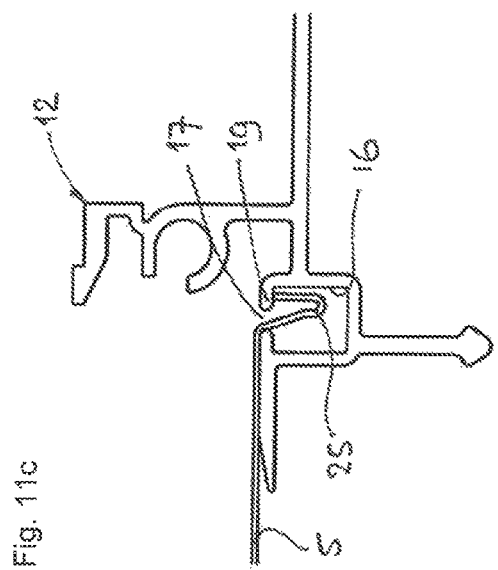
Figure 12:
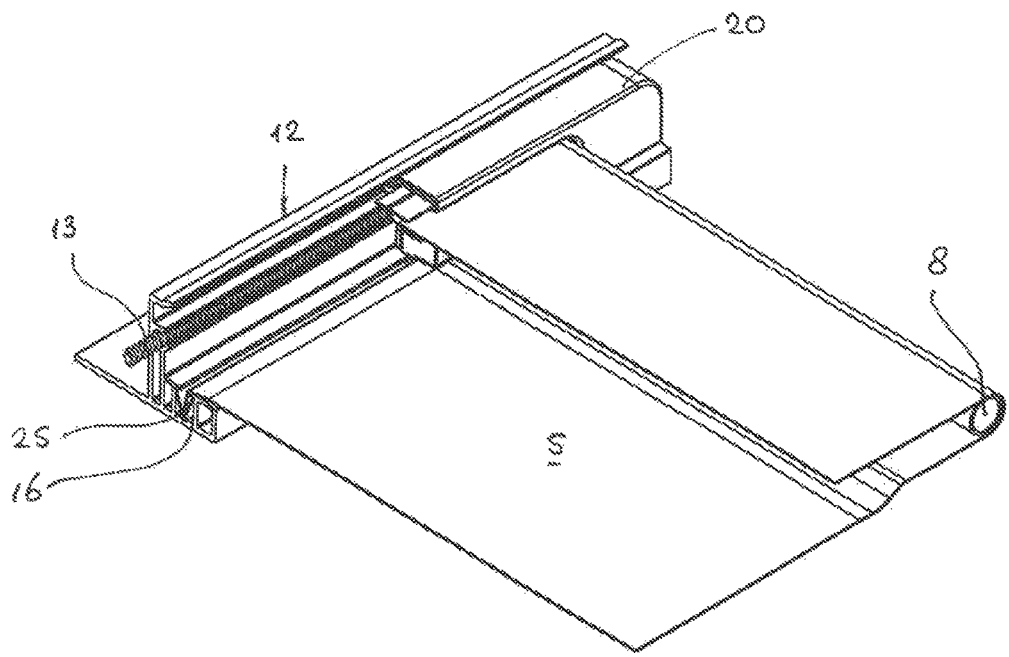
Figure 13:
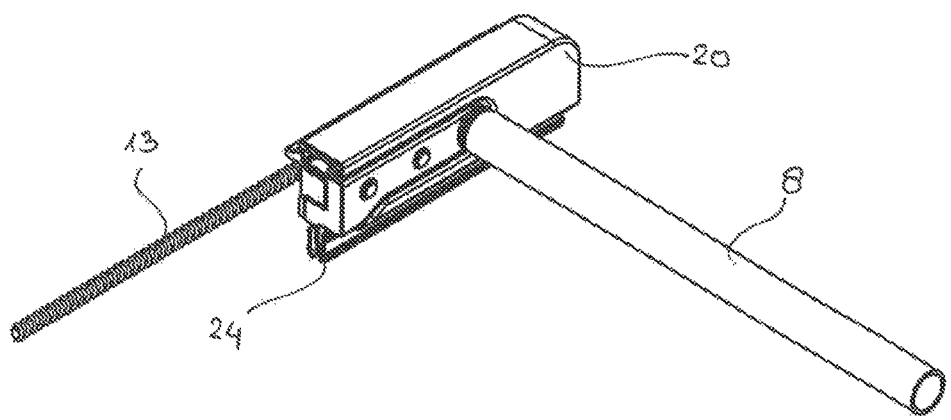
Figure 15A:
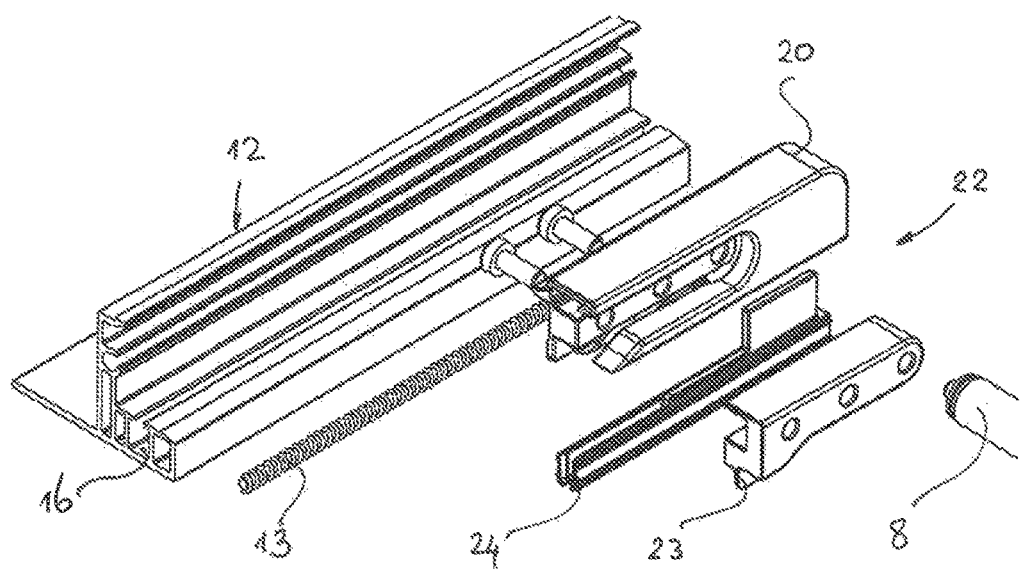
Figure 15B:
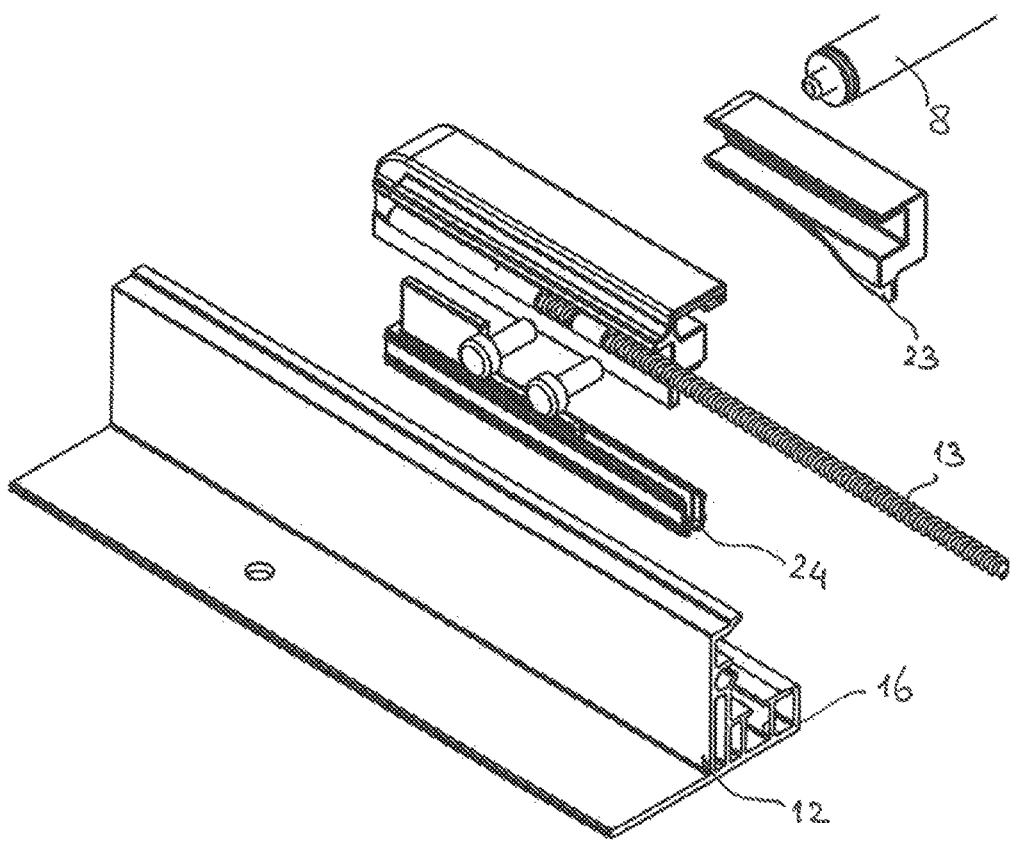
Figure 16A:
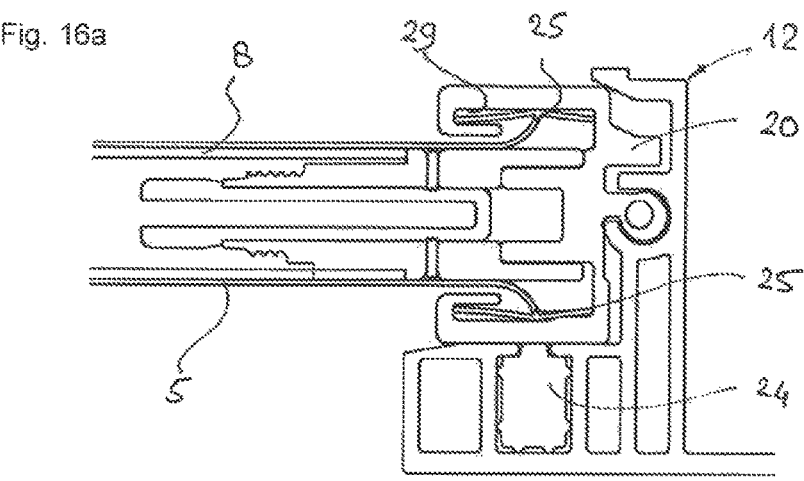
Figure 16B:
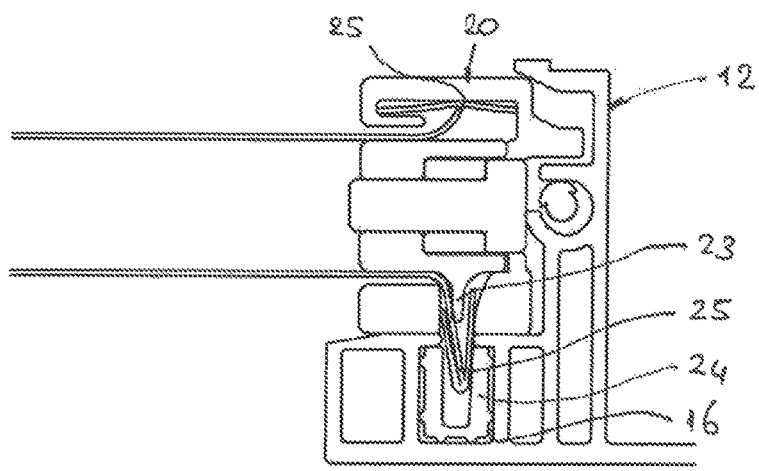
Figure 16C:
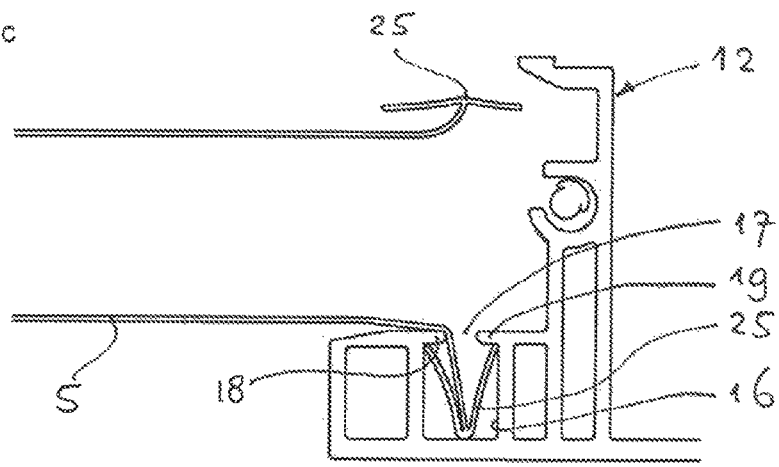

FIGS. 11a-11d show different configurations of the hooking member 25 and holding groove 16. FIG. 11a shows an arrangement similar to that in the embodiment of FIGS. 4-7 (although the height of the holding groove is so small that no locking rod is provided. FIG. 11b shows a variation in which the hooking member 25 is arrow-shaped, i.e. it has two hooks or rigid strips, one on each side of the rollo screen 5. Each strip engages the respective rib 18 or 19 bordering the narrow entrance opening 17 of the holding groove 16. In the variation of FIG. 11c the narrow entrance opening 17 of the holding groove 16 is on the upper side thereof, so that the hooking member 25, here with a single strip, must now be inserted into and removed from the holding groove 25 in a vertical direction. In FIG. 11d, the holding groove 16 having the narrow entrance opening 17 on the upper side is combined with the arrow shaped hooking member 25.

FIGS. 12-16 show an embodiment of the rollo assembly having the hooking member and holding groove arrangement of FIG. 11d.

FIGS. 12-16 show that slider 20 comprises a guide 29 for the hooking member 25 where it is flattened in vertical direction and points in upward direction. When it is reversed at the reversal member 8 it will point downward (FIG. 16a) and is then ready to be introduced into the holding groove 16 when it is flattened in horizontal direction in order to pass the narrow entrance opening 17 (FIG. 16b). A knife-shaped element 23 is again provided to push the hooking member 25 into the holding groove 16 past the narrow entrance opening 17 (FIG. 16c). A compressing element 24 is also present (see FIG. 16b), operating in the same manner is in the former embodiment.

The rollo screen 5 adjacent the hooking member 25 is angled approximately 90 degrees into the holding groove 16. The arrow shaped hooking member 25 will hook behind both ribs 18, 19 defining the narrow opening 17. In combination with the angled pulling force from the rollo screen 5, a very reliable hooking within the holding groove 16 is accomplished.

FIGS. 17-19 show the variation of the rollo assembly 4 with a rotating knife-shaped element 23 to push the hooking member 25 into the holding groove 16. The outlet of the guide groove 29 in the slider 20 is adjacent to the entrance 17 of the holding groove 16. The compressing element 24 guides the hooking member 25 towards the rotating knife-shape element 23.

Further variations are shown in the following figures.

FIGS. 20, 21 show an embodiment in which a pushing member 30 of the rollo screen displacement device 22 remains outside the holding groove 16. The compressing element 24 has a portion 24a outside the holding groove 16. The hooking member 25 is guided by it and the pushing member 30 pushes the hooking member 25 from the outside portion 24a to the inside portion 24b of the compressing element 24. Once there the compressing element 24 ends and the arrow-shaped hooking member 25 unfolds and is then locked within the holding groove 16. The edge 11 of the rollo screen 5 adjacent the hooking member 25 and the hooking member 25 itself are made from hard plastic so that it is possible to exert a pushing force onto it.

Figure 22A:
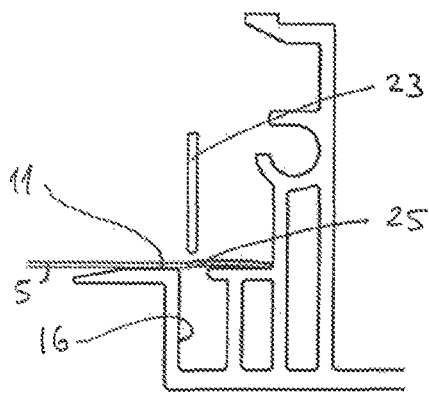
Figure 22B:
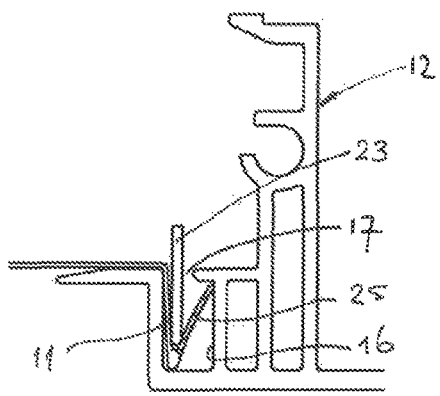
Figure 23A:
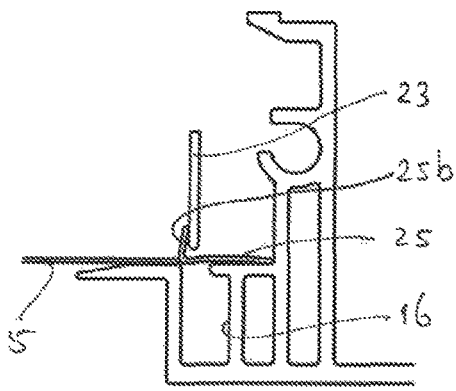
Figure 23B:
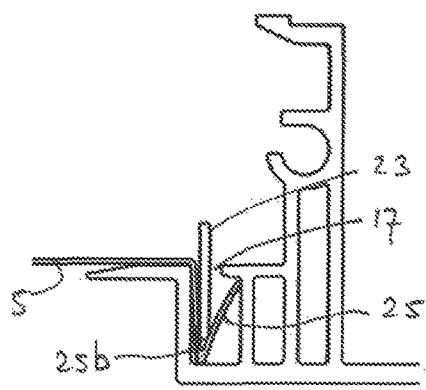
Figure 24A:
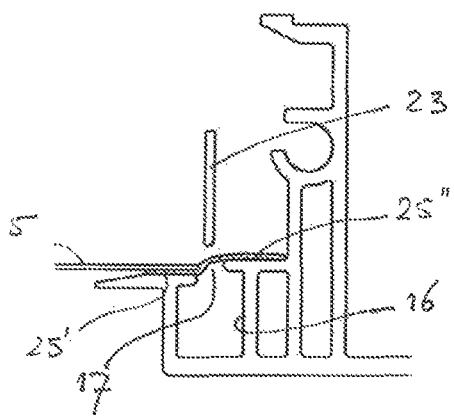
Figure 24B:
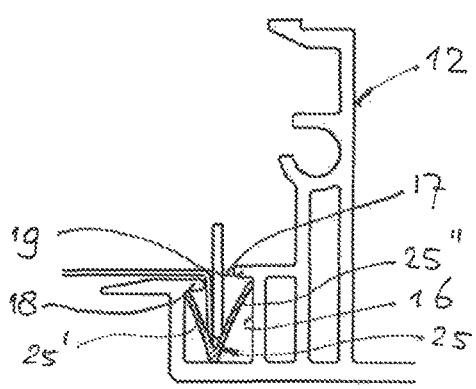

FIGS. 22-24 show some further examples of manners to introduce the hooking member 25 into the holding groove by means of the knife-shaped element 23. In FIG. 22a it is shown that the hooking member 25 and adjacent rollo screen edge 11 are substantially aligned when outside the holding groove 16. The knife-shaped element 23 pushes downwardly at the position where the strip of the hooking member 25 starts, i.e. where the strip will be angled down to form the hooking member 25 according to FIG. 22b.

In the variation of FIG. 23a, 23b, the strip of the hooking member 25 is provided with a relatively rigid flap 25b pointing upwards in the position of FIG. 23a, and forming a reference point for the knife-shaped element 23. The knife-shaped element 23 will push in the inward angle between the strip and the flap of the hooking member 25 which will reduce wear to the rollo screen, also if the knife-shaped element 23 and the hooking member 25 slide with respect to each other, as the knife-shaped element is in contact with relative rigid and sturdy plastic material only.

FIG. 24a shows a further variation in which the hooking member 25 is arrow-shaped, such that there is an inward short arrow arm 25' and an outward longer arrow arm 25". The height of the holding groove at the position of the ribs 18 and 19 is adapted to the length of the arrow arms 25' and 25". The difference in length is chosen as a result of the fact that the outward arrow arm 25" will easier and earlier be introduced into the holding groove 16 than the inward arm 25'.

Figure 25A:
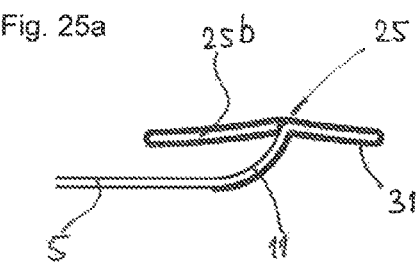
Figure 25B:
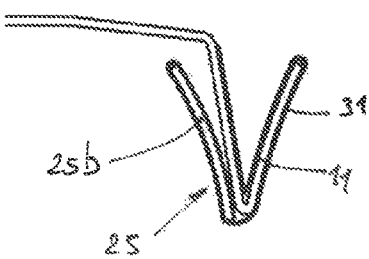

FIGS. 25a,b show two positions of an embodiment of the arrow-shaped hooking member 25 before and after it is introduced into the holding groove 16. In this embodiment the hooking member 25 is formed by the edge 11 of the rollo screen 5 and an additional plastic strip 25b, both covered by a plastic layer 31 to attach the plastic strip and to make the edge of the rollo screen more rigid. In FIG. 25a, the arrow is folded flat and points upwards, while in FIG. 25b, it points downwards.

Figure 26A:
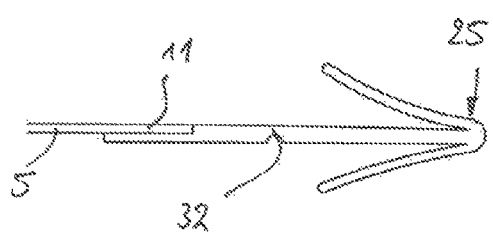
Figure 26B:
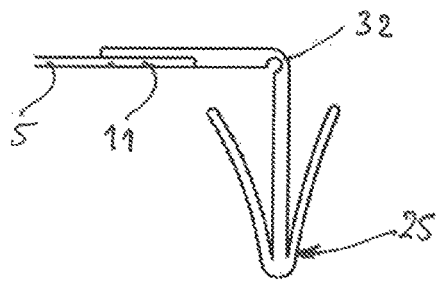

The embodiment of FIG. 26 comprises a one piece arrow-shaped hooking member 25 which is attached to a shortened edge 11 of the rollo screen. The body of the arrow includes a living hinge 32 to allow the rigid body to be bent into a 90 degree angle (FIG. 26b).

Figure 27A:
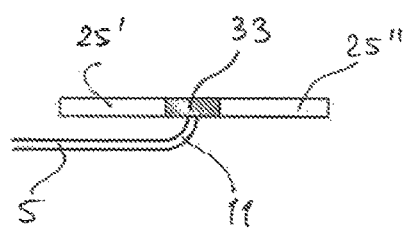
Figure 27B:
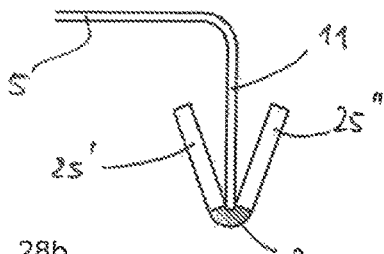

FIG. 27 shows an embodiment in which the arrow includes a flexible center piece 33 attached at right angles to the edge 11 of the rollo screen. The rigid arms 25', 25" of the arrow are attached to opposite ends of the center piece, and can be folded by means of the flexible center piece between the straight (FIG. 27a) and pointed position (FIG. 27b). The arrow-shaped hooking member 25 may for example be formed by 2K extrusion to obtain portions (33, 25', 25") of the hooking member 25 having different characteristics.

Figure 28A:
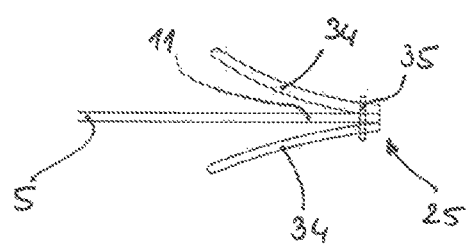
Figure 28B:
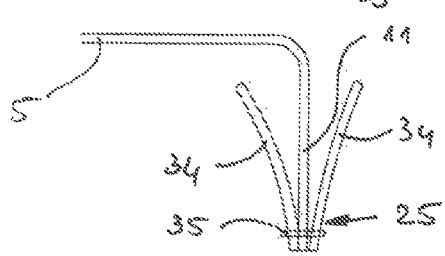

FIG. 28 shows a last embodiment in which the arms of the arrow are each formed by a loose pre-curved strip 34 attached, here by means of a stitch 35, to the edge 11 of the rollo screen 5. The resilient strips 34 can be deformed so as to be more straight and able to enter the holding groove 16 through the narrow entrance 17 and then return to the original shape to act as a hooking member 25.

The guide 12 comprises next to and inward of a cable guide channel 114 a holding groove 117 having a part-circular cross-section and a narrow upper entrance opening 118. The entrance opening 118 is directed substantially vertically, but could also be directed horizontally towards the opposed holding groove 117 of the other guide 12. The reversal member 8 and the cover member 15 (not shown here) form the operating beam for the sunscreen 5. At each end of the operating beam, there is provided a slider 120 to which the drive cable 13 is attached. The slider 120 is guided by one or more guide grooves 121 in the guide 12. Rollo screen displacing device 122 are attached to the slider 120. In this embodiment, it comprises a disk-shaped element 123. This element 123 is used to hold edge area 11 of rollo screen 5 in transverse direction so that when a part of the edge area 11 of the rollo screen 5 is inserted into the holding groove 117 rollo screen 5 is stretched from the inside instead of the edge of rollo screen 5 being pulled inwardly.

In order to keep the edge area 11 in the holding groove 117, there is provided a locking element 124, which in this case is an elongated cable, rope, wire or cord-like element having a length larger than the length of the holding groove 17. The cross-section of the locking element 124 is of the same shape as that of the holding groove 117 and is such that it fits easily into the holding groove 117 when it is lined with the edge area 11 of the rollo screen 5, but only fits through the entrance opening 118 of the holding groove if either the edge area 11, the entrance opening 118 or the locking element 124 itself is elastically deformed, i.e. bent or compressed. This prevents the locking element from leaving the holding groove 117 unintentially and also causes the locking element 124 to clamp the edge area 11 of the rollo screen 5 to the wall of the holding groove when pulling forces are exerted on the rollo screen. Thus, if the rollo screen 5 is stretched when the edge area 11 is urged into the holding groove 117, this stretching force will help the locking element 124 to clamp and thus hold the edge area 11 in the holding groove 117. Means may be provided to ensure that the rollo screen 5 is stretched, which will be shown and discussed later on.

The material of locking element 124 may be chosen taking several variables in consideration: friction with various contacted parts like edge area 11, buckle resistance, flexibility, compressibility etc. Possible configurations are: solid steel cable, twisted steel cable or wire, nylon, rubber-like or PMMA cable. A 2 mm PMMA cable appears useful. To achieve compressibility, not only the material is decisive, also the construction of the cable, such as a hard core with a compressible cladding, a compressible core with a hard but flexible cladding, a hollow core with a flexible cladding etc.

Locking element displacing device is provided in the form of a nose-shaped inserting element 125 (rotatable or not) to force the locking element 124 through the entrance opening 118 into the holding groove 117 and a wedge or finger-shaped removing element 126 lifting and forcing the locking element 124 out of the holding groove 117 again. The forces exerted by these elements on locking element 124 is much larger and directed differently compared to the stretching force exerted by the rollo screen 5. The finger-shaped removing element 126 is mounted closer to the rollo screen displacing device 122 than the nose-shaped inserting element 125. The removing element 126 for locking element 124 also acts as rollo screen displacing device 122 for edge area 11 of rollo screen 5 as it holds edge area down just before locking element 124 is inserted into holding groove 117. If disk-shaped element 123 is not present (see FIG. 47) finger-shaped element 126 acts as an inserting element for edge area 11 of rollo screen 125.

FIGS. 33a-33d show how the edge area 11 of the rollo screen 5 and the locking element 124 are forced by the elements 123, 125 and 126 into holding groove 117 when operating beam 8 is moved to close rollo screen 5.

Figure 33A:
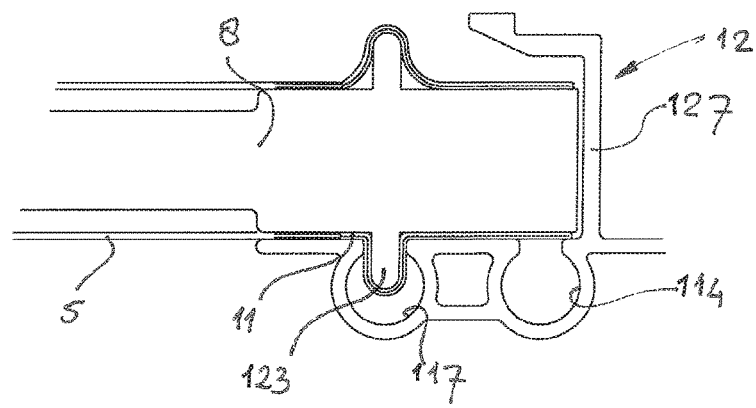
FIGS. 33a-33d are cross sectional views along the line XXXIIIa-XXXIIId, respectively, in FIG. 32.
Figure 33B:
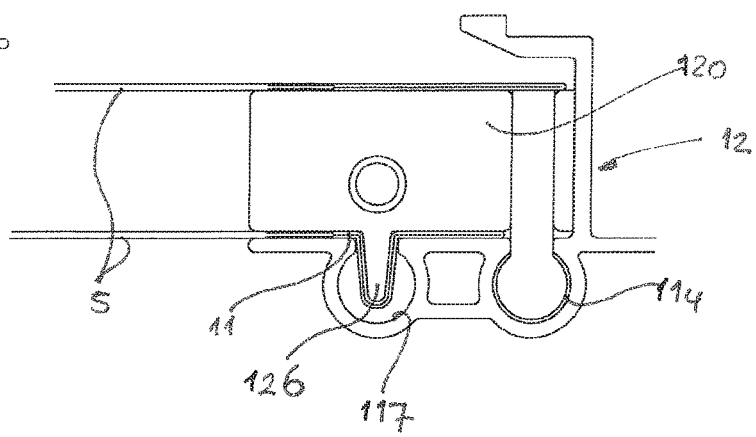
Figure 33C:
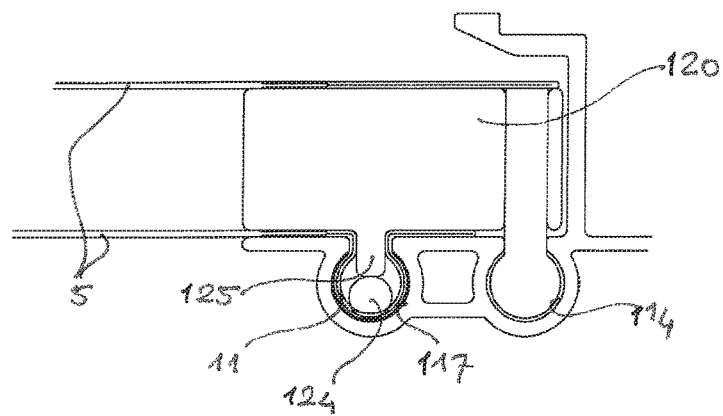

In FIG. 33b, the knife-shaped removing element 126 keeps the edge area 11 down in the holding groove 117, before the locking element 124 is inserted into the holding groove 117 by the nose-shaped element 125, as shown in FIG. 33c.

Figure 33D:
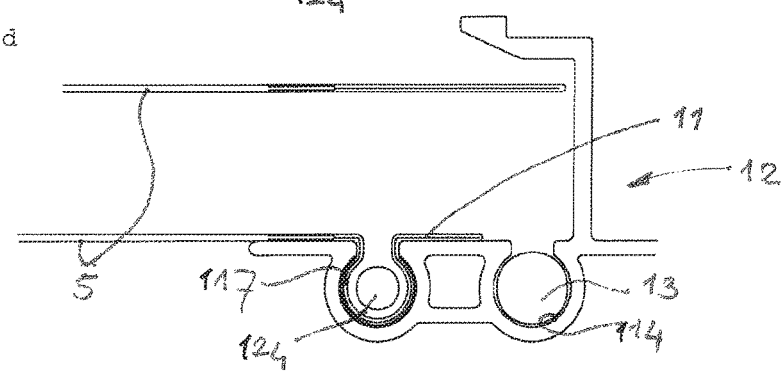

The situation as shown in FIG. 33d is not exactly as in reality as the pulling forces from the left as exerted by the rollo screen 5 will push the locking element 124 upwardly against the wall of holding groove 117 next to entrance opening, where locking element 124 will clamp and hold the edge area 11 within holding groove 117.

In the embodiment of FIGS. 29-33, the excess length of locking element 124 which is outside holding groove 117 is taken up by the operating beam 8, which is for example shown in FIGS. 29 and 30. FIG. 31 shows the curvature of locking element 124 at the transition from holding groove 117 to operating beam 8. Further details will be provided further down. In these embodiments, locking element 124 is stationary in longitudinal direction of guide 12, so that it does not move in longitudinal direction with respect to the edge area 11 of rollo screen 5 when the rollo screen is deployed.

FIGS. 34-41 show various configurations for holding groove 117 and locking element 124.

The embodiment of FIG. 34 is similar to that of FIGS. 29-33, except that the rollo is operated manually by moving the rollo through the cover member 16 of reversal member 8 (see FIG. 1), which will be provided with a hand grip or the like. A drive cable 13 and cable channel 114 in guide 12 is not required then.

FIG. 35 shows again the configuration as in FIGS. 29-33.

In the FIG. 36 embodiment, there is again a drive cable 13 and cable channel 114, but this cable channel 114 is positioned higher than holding groove 117, in this case at an upright flange 127 of guide 12. The opening 118 of cable channel 114 is now directed horizontally toward to opposite cable channel 114 (not shown here).

FIG. 37 illustrates that cable channel 114 can be used to accommodate locking element 124 when it is removed from holding groove 117. So, instead of being guided into reversal member 8 it is guided towards and into cable channel 114 which is empty on the side of the slider 120 away from rollo screen 5. Slider 120 will have a guide element, such as a guide channel to guide 124 locking element between cable channel 114 and holding groove 117.

In the embodiment of FIG. 38, holding groove 117 is again positioned next to cable channel 114, but now with a substantially horizontally directed entrance opening 118 and below cable channel 114. Edge area 11 of rollo screen 5 is provided with an additional, more rigid stop member 128 preventing edge area 11 of rollo screen 5 from slipping beyond locking member 124 and out of holding groove 117.

The FIG. 39 embodiment is comparable to that of FIG. 37 but in this case holding groove 117, or at least its entrance opening 118, is made such that it can be deformed elastically to allow locking member 124 to enter and leave holding groove 117 while edge area 11 is within holding groove 118. As mentioned before, at least one of locking member 124, edge area 11 and entrance opening 118 must be elastically deformable. The cross sectional size of locking member 124 is such that it could enter and leave entrance opening 118 without edge area 11 extending into and out of holding groove 117. If edge area 11 is within holding groove 117 twice the thickness of edge area 11 of rollo screen 5 extends through entrance opening 118 making this opening smaller for locking member 124. In the embodiments of FIGS. 34-38, either locking member 124 and/or edge area 11 is made of elastically deformable material.

In the FIG. 40 embodiment a wall part 128 of holding groove 117 is made of a separate, elastically deformable, i.e. flexibly bendable piece of material 129 fixed to guide 12, for example clamped in a mounting groove 130 at an edge facing away from holding groove 117.

The embodiment of FIG. 40 is comparable to that of FIG. 35, but includes a holding groove 117 and a locking element 124 having a trapezium-shaped cross section, the short side of which is at the entrance 118.

Figure 41:
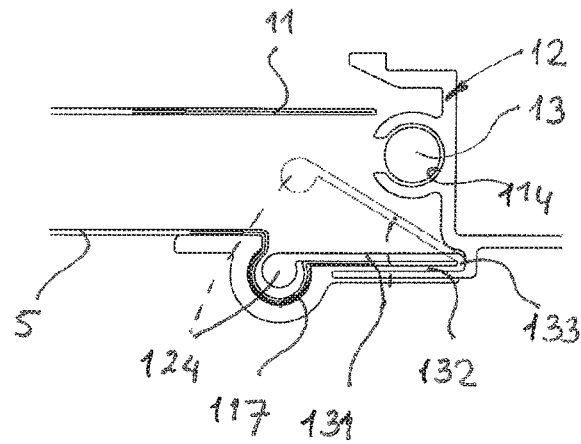
FIGS. 41-44 are simplified plan views the subject of FIG. 31 for three different embodiments.

In FIG. 41, locking element 124 is provided with its own accommodating member 131, here in the form of a holding arm extending preferably along the entire length of locking element 124. The accommodating member 131 is connected to a mounting part 132 via a folding line 133 through which the accommodating member and therefore locking element 124 is movable between a holding position, in which locking element is within holding groove 117, and a resting position dictated by the accommodating member 131. The accommodating member 131 may also clamp the outer edge of the edge area 11 onto guide 12 to even better hold edge area 11 of rollo screen 5.

Figure 42:
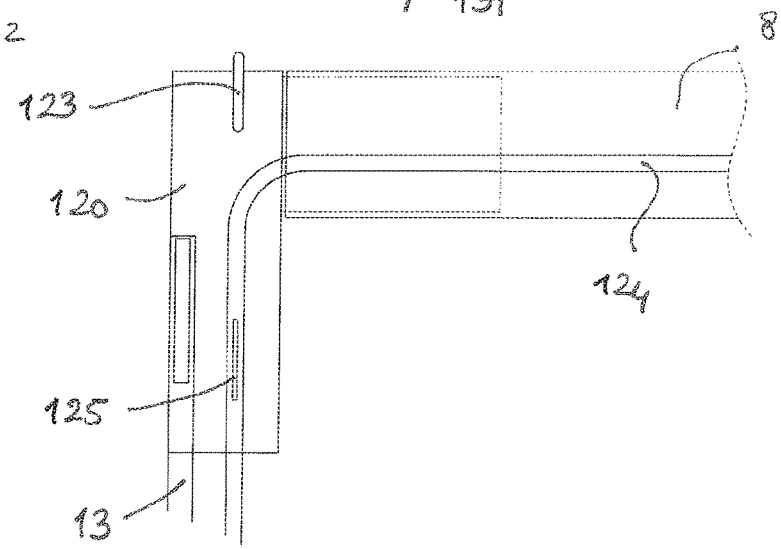

FIG. 42 shows how locking element 124 is guided into reversal member 8 of FIGS. 29-32.

Figure 43:
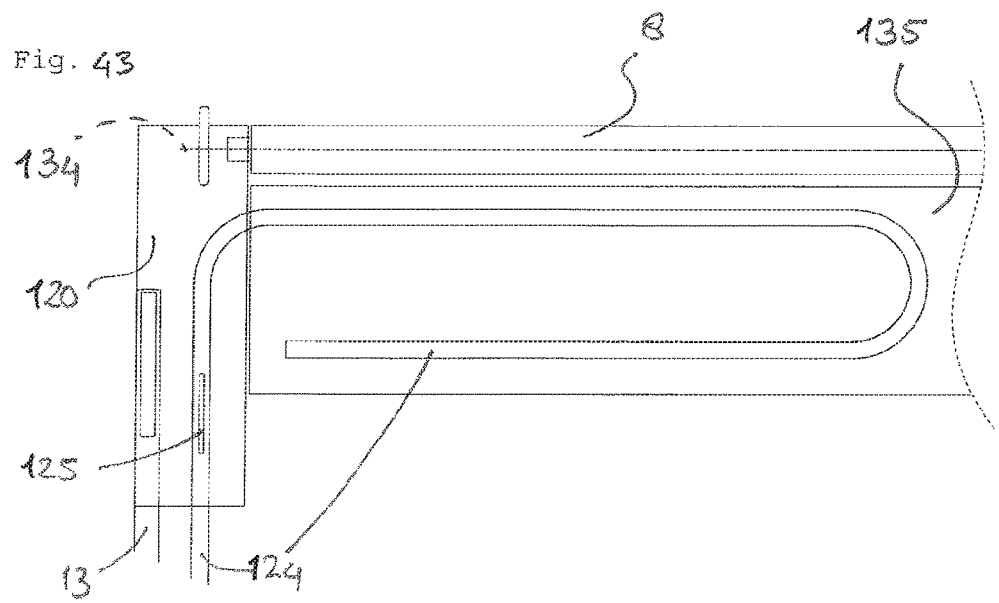

FIG. 43 illustrates another embodiment in which reversal member 8 is a roller rotatable around an axis of rotation 134. Behind reversal member 8, there is provided a hollow accommodating beam 135. The hollow beam 135 is large enough to accommodate a length of locking element 124 which is folded into a zig-zag or loop-shape.

Figure 44:
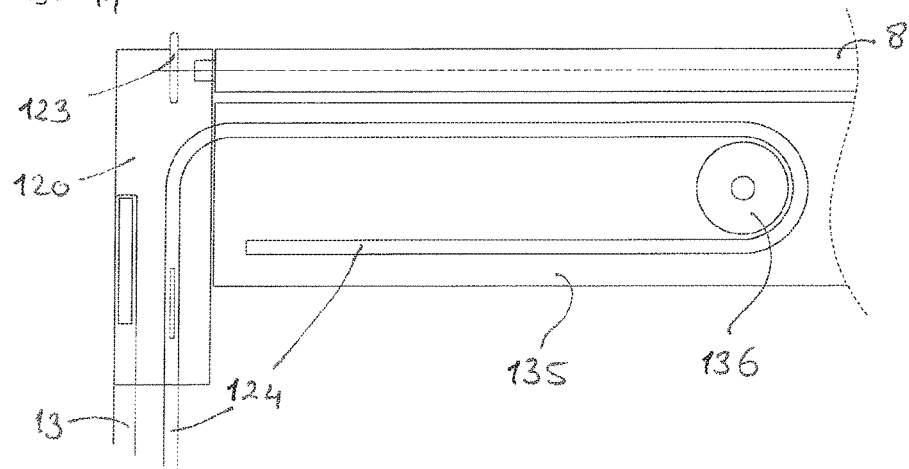

FIG. 44 shows a substantially horizontally rotating pulley 136 around which locking element 124 can be guided into the desired shape. More pulleys may be provided if desired.

Figure 45:
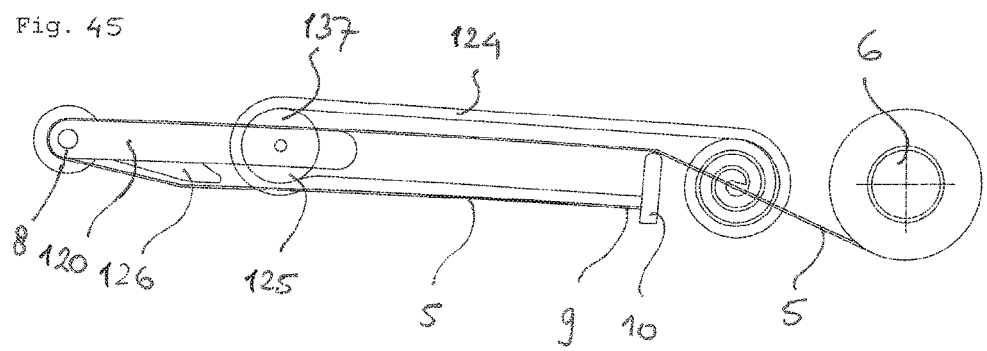
FIGS. 45, 46 are views corresponding to that of FIG. 32, but showing two other embodiments of the sunshade assembly.

FIG. 45 illustrates a further embodiment, in which elongated locking element 124 is windable or self-winding and is guided back along a pulley 137 (which may also act as inserting element 125) towards winding shaft 6 where self-winding locking element 124 is allowed to wind, for example on a winding shaft not shown. Of course, it would also be possible to allow the winding shaft to exert a winding force, so that locking element 124 does not have to be self-winding, but is wound by the force of the winding shaft. The force of the winding shaft could be a spring force, but the winding shaft could also be driven. In principle, locking element 124 could also be wound on the ends of winding shaft 6, although these ends should be able to rotate at a speed different from the part of winding shaft 6 winding the rollo screen 5, or the thickness of both should be equal.

Figure 46:
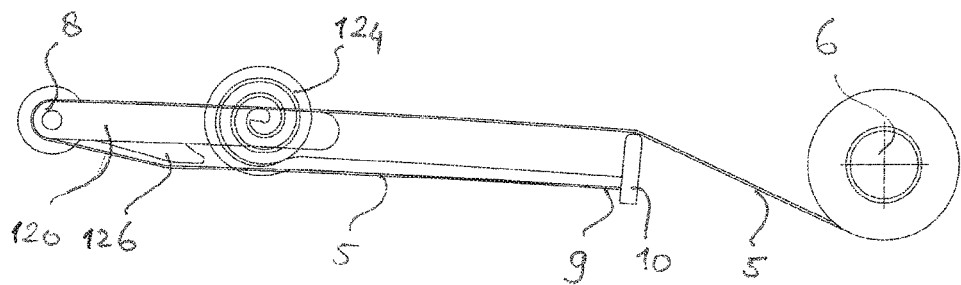

FIG. 46 shows that if space allows, the winding shaft for locking element 124 could also be at the position of pulley 137 of FIG. 45, i.e. at slider 120, so that locking element 124 does not have to be guided back towards winding shaft 6. The winding shaft for locking element 124 could also be oriented differently, e.g. substantially vertically.

Figure 47:
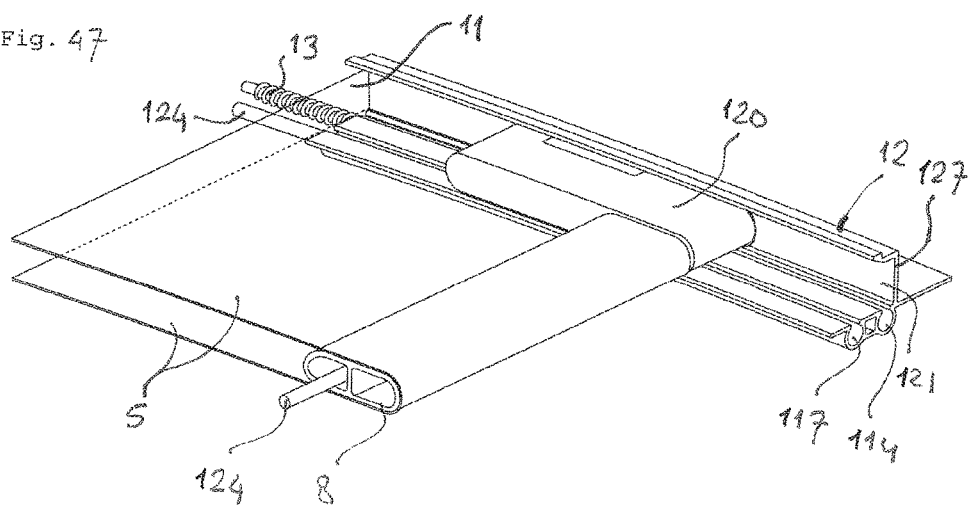
Figure 48:
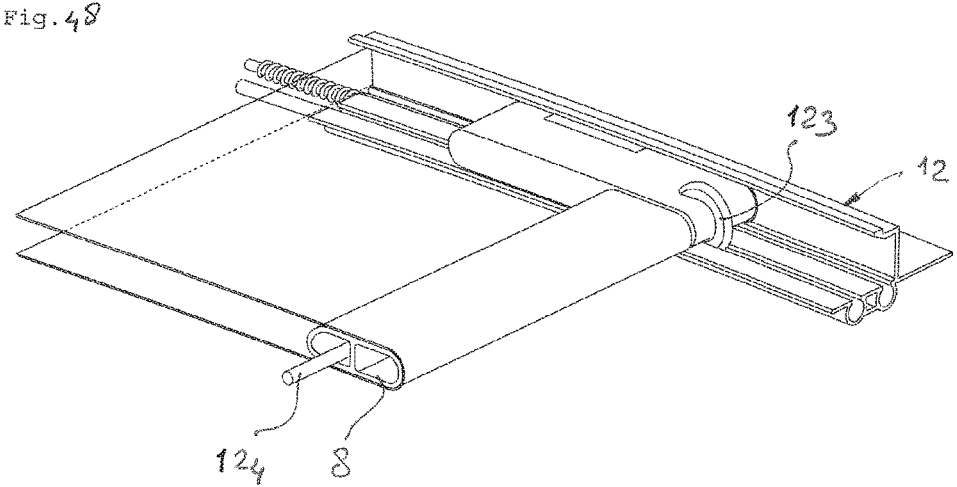

FIGS. 47 and 48 show two different embodiments, wherein that of FIG. 48 is to ensure a tension in rollo screen 5 and to ensure that the edge of rollo screen 5 is not pulled inwardly when edge area 11 is inserted into holding groove 117. In the embodiment of FIG. 48, it is element 123 protruding at least upwardly and forwardly to tension the cloth of rollo screen 5 before it is inserted in holding groove 117 by either element 123 or finger-shaped element 126.

FIGS. 49-53 show different configurations of edge area 11 of rollo screen 5, especially regarding the presence of one or more stop members providing additional safety against the edge area 11 moving past tensioning element 123 and/or slipping out of holding groove 117.

Figure 49:
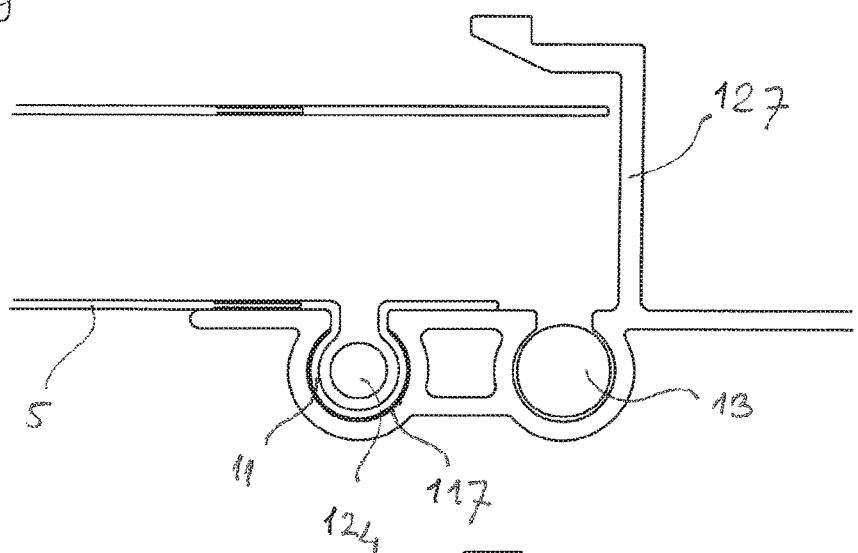

FIG. 49 shows rollo screen 5 as in FIGS. 29-33 in which there is only a position where edge area 11 connects to the remainder of rollo screen 5. Edge area 11 may be different from the remainder of rollo screen 5, for example more or less elastic, more pliable, thinner or thicker, or the like. It may also be made of cheaper material compared to the portion of the rollo screen 5 that is visible that should have an aesthetic nice appearance. The edge area 11 only has functional requirements, so if a certain embodiment of the edge area 11 is chosen, it can be combined with different cloth types for the visible portion of rollo screen 5.

Figure 50:
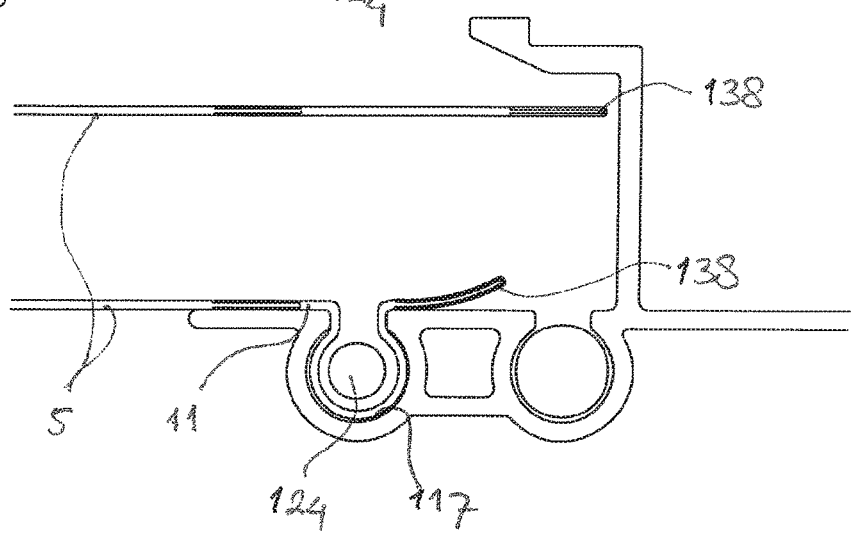

FIG. 50 shows an edge area 11 provided with a so called fabric strip 138 wrapped and heat-welded around the outer edge of edge area 11 acting as stop member.

Figure 51:
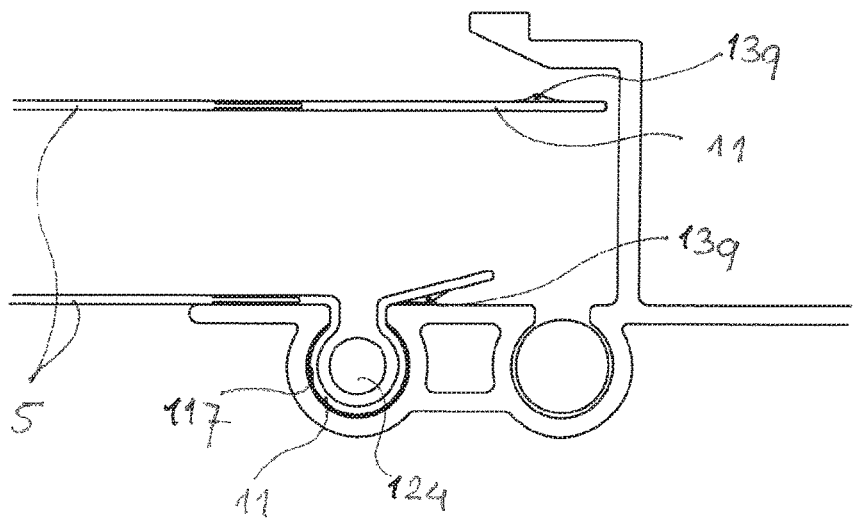

In FIG. 51 there is a steel wire 139 or the like attached, e.g. stitched to the cloth of edge area 11 of rollo screen 5 to act as stop member.

Figure 52:
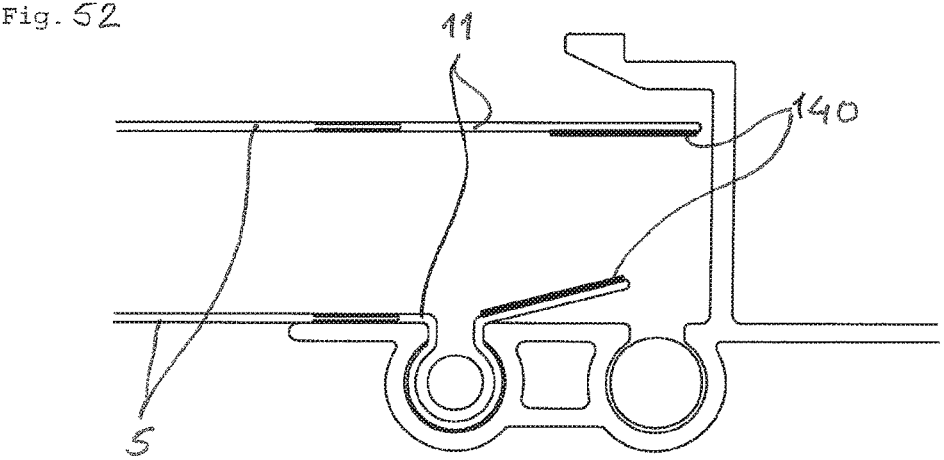
Figure 53:
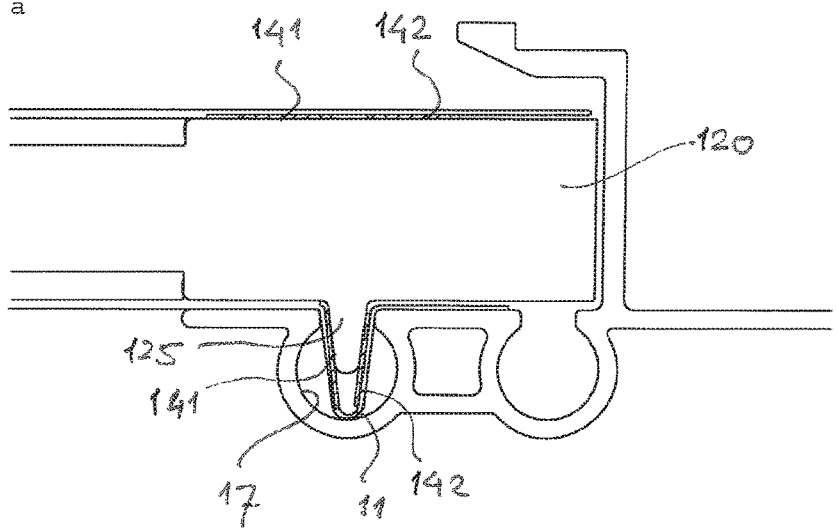
Figure 53:
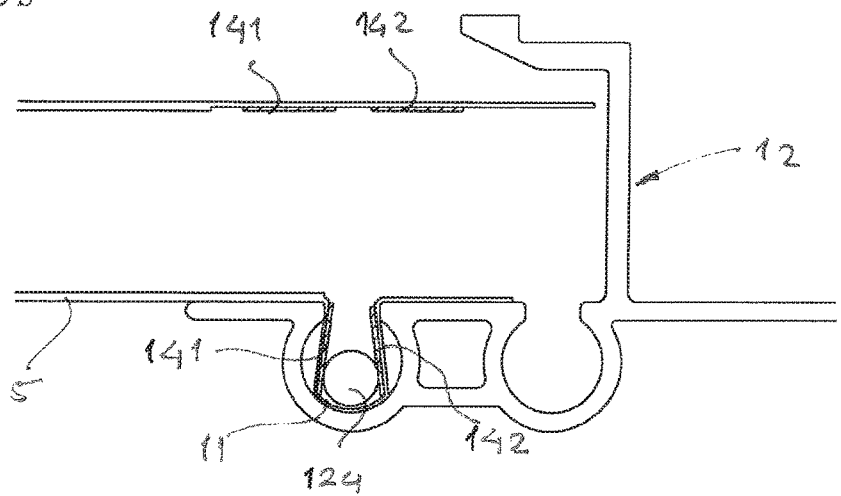

In the embodiment of FIG. 52, there is a stop member in the form of a strip 140 attached to one side of the outer edge of edge area 11. This strip 140 can be made of many types of material, like steel, or plastic and can be heat-welded, glued or stitched to it, for example. To further improve the locking function of edge area 11 of rollo screen 5, it can be provided with 2 additional strips 141, 142 acting as stop members and as shown in FIG. 53*a*, 53*b*. They are positioned inward of the outer edge at the location where the edge area should be inserted into holding groove 117. The strips are spaced apart such that edge area 11 can bend between strips 141, 142 as is shown in FIG. 53*a* and can take up locking element 124 between them as is shown in FIG. 53*a*. The edge area 11 of rollo screen is now even more reliably locked in holding groove 17.

Figure 54:
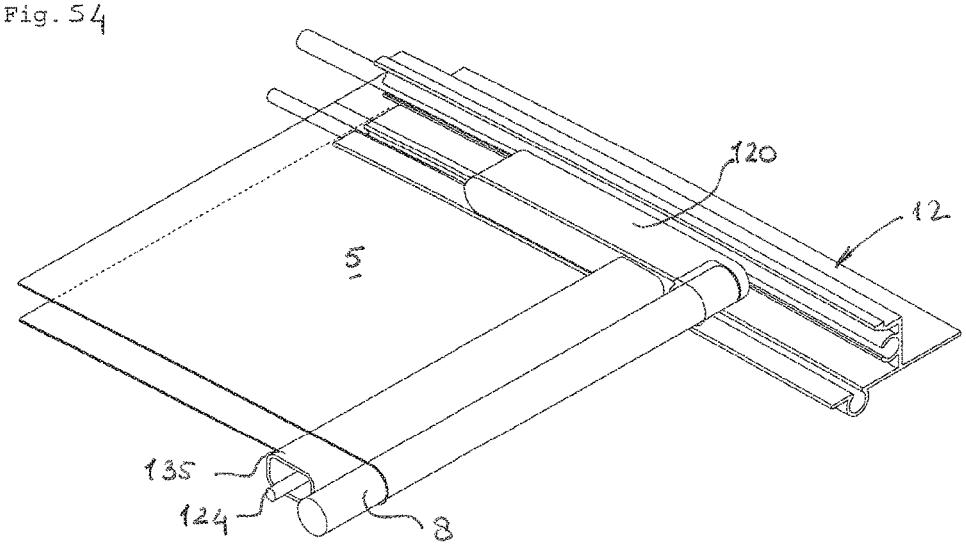
FIGS. 54, 55 are views similar to that of FIG. 38, but showing different embodiments of the reversal member.
Figure 55:
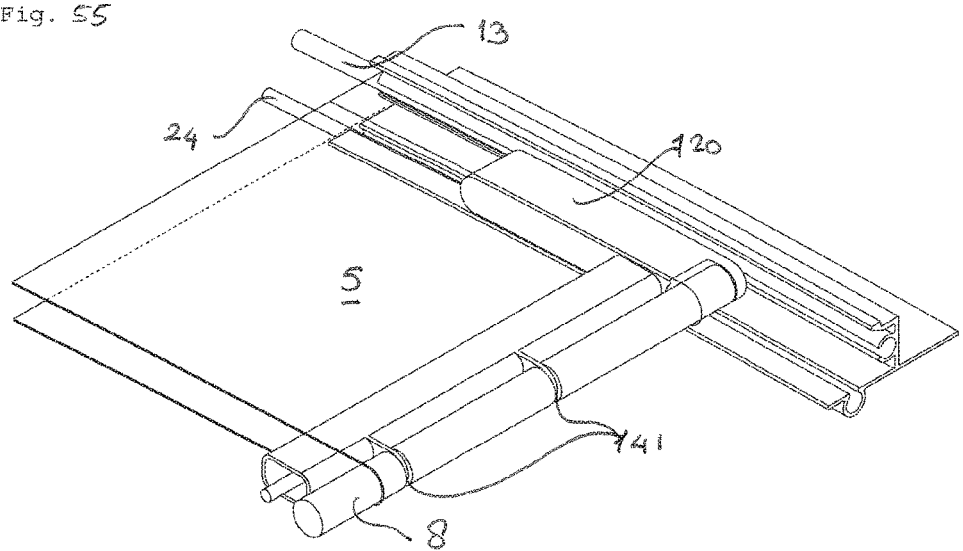

FIGS. 54 and 55 show embodiments of the sunshade assembly in which the operating beam is provided with a roller as reversal member 8, like in the embodiments of FIGS. 43, 44. In FIG. 54, there is provided a single roller rotatably supported at both ends, while in the FIG. 55 embodiment the roller has several supports 141 distributed along its length to prevent the roller of reversal member 8 from becoming flexed.

Figure 56:
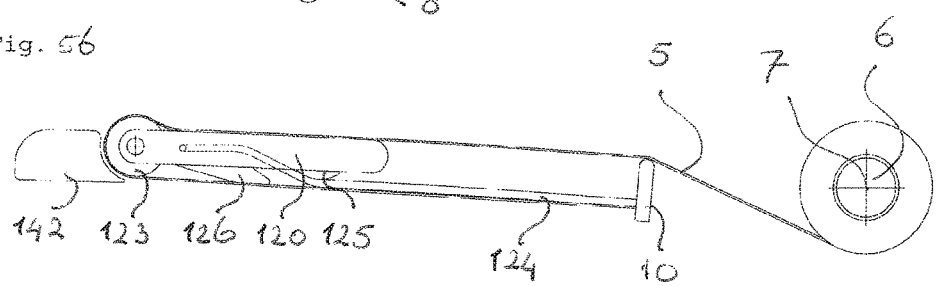
FIG. 56 is a view corresponding to that of FIG. 22, with an added rollo screen displacement device.

The embodiment of FIG. 56 is similar to that of FIG. 32, except for an added member 142 of the rollo screen displacement device 122, ensuring that edge area 11 of rollo screen 5 is removed from holding groove 117 when element 123 moves along rollo screen 5 to wind it on winding shaft 6 via reversal member 8. It may replace or complement cover member 116.

The invention is not limited to the embodiments described before, which may be varied widely within the scope of the invention as defined by the appending claims. For example, it would be possible to provide a rollo assembly without a reversal member. The winding shaft is then arranged at the position of the reversal member, so that the winding shaft moves when the rollo screen is wound or unwound. The locking element could also be non-stationary and move with reversal member 8. In this case, the excess length of the locking element created when opening, i.e. winding the rollo screen comes out of the holding groove at a position near the winding shaft.

The translucent rod-shaped member with the light source could have a wider range of use. Such movable or stationary rod-shaped member could be combined with any kind of rollo system or even any kind of open roof construction, as long as there is a guide having a groove in which the translucent rod shaped member can be accommodated and which has one or more openings, preferably elongated as the narrow opening in the holding groove, through which the light from the rod-shaped member could be transmitted to the interior of the vehicle, particularly towards the lower side of the rollo screen. The rod-shaped member could move with a drive member, such as the drive cable or a part of a mechanism coupled to it. It could also be stationary. It could be provided in its own groove or in a common groove, for example together with the hooking member or drive cable. As mentioned before, the light source could be arranged at the end of the rod-shaped member or along the length thereof. The rod-shaped member could be made of PMMA and could be bendable, which is especially convenient if it is movable so that it can have its own run-out tube which is curved and bent inwardly.

Although the subject matter has been described in a language specific to structural features, it is to be understood that the subject matter defined in the appended claims is not necessarily limited to the specific features described above. Rather, the specific features and acts described above are disclosed as example forms of implementing the claims. For example, the wing of the sunscreen may be unfolded when wound on the winding shaft, but may also be wound in its folded position.

What is claimed is:

1. An open roof construction for a vehicle having a roof opening in a stationary roof part comprising a rollo assembly positioned below said roof opening and configured to cover the roof opening, the rollo assembly comprising a rollo screen and a winding shaft, said rollo screen including a rollo screen edge which is attached to a stationary member of the open roof construction, wherein an opposite edge being formed by an operating beam which is movable parallel to the roof opening in first and second directions in correspondence with an amount of rollo screen being wound on or off said winding shaft, the rollo screen having two longitudinal edges which, when the rollo screen is wound off, are brought into engagement with holding members extending alongside the longitudinal edges of the roof opening, wherein the holding members each comprise a least a holding groove having a narrow entrance, the longitudinal edge areas of the rollo screen each cooperating with a locking member which is insertable into the holding groove and hooks behind the narrow entrance thereof thereby holding the respective longitudinal edge of the rollo screen in the holding groove, the operating beam being provided with a device acting on at least one of the locking member and holding groove to enable the locking member and the edge area of the rollo screen to enter and exit the holding groove.

2. An open roof construction for a vehicle, comprising a roof opening in a stationary roof part and a rollo assembly positioned below said roof opening intended for covering the roof opening, wherein the rollo assembly comprises a rollo screen and a winding shaft for the rollo screen which is rotatable around a stationary axis of rotation, and wherein the rollo screen, starting from the winding shaft, firstly extends in a first direction, next around a reversal member and finally back in a second opposite direction and ends at a rollo screen edge which is attached to a stationary member of the open roof construction, wherein the reversal member supports the screen and is movable parallel to said first and second directions in in correspondence with the amount of rollo screen being wound on or off said winding shaft, the rollo screen having two longitudinal edges which, when the rollo screen is wound off, are brought into engagement with holding members extending alongside the longitudinal edges of the roof opening, wherein the holding members each comprise at least a holding groove having an elongated entrance opening, the longitudinal edges of the rollo screen, together with a locking member clamping the rollo screen in the holding groove, being insertable into the holding groove through the elongated entrance opening with a device attached to the reversal member, wherein the locking member, the edge area of the rollo screen and the holding groove have at least one of a shape and dimension preventing the locking member and the edge area of the ran screen from leaving the holding groove through the elongated entrance opening.

3. The open roof construction according to claim 1 wherein the locking member, the edge area of the rollo screen and the holding groove have at least one of a shape and dimension preventing the locking member from unintentionally leaving the holding groove through the elongated entrance opening.

4. The open roof construction according to claim 1, wherein entrance opening of the holding groove is more narrow than the holding groove, such that the locking member is locked within the holding groove when the locking member and the edge area of the rollo screen are inserted in the holding groove through the entrance opening.

5. The open roof construction according to claim 4, wherein the operating beam is provided with displacing means acting on at least one of the locking member and holding groove to enable the locking member to enter and exit the holding groove together with the edge area of the rollo screen.

6. The open roof construction according to claim 5, wherein at least one of the edge area of the rollo screen, the locking member and the holding groove is resiliently deformable to enable the locking member to enter and exit the holding groove.

7. The open roof construction according to claim 4, wherein each longitudinal edge area extends into the holding groove through the entrance opening, around the locking member and then out of the holding groove again.

8. The open roof construction according to claim 1, wherein a stop member is provided at or near the longitudinal edges of the rollo screen and is adapted to cooperate with the locking member to ensure the rollo screen remains locked in the holding groove.

9. The open roof construction according to claim 1, wherein the locking member is stationary in longitudinal direction with respect to the holding groove, and wherein the operating beam is adapted to accommodate the locking member when it exits the holding groove in case the operating beam is moved to wind the rollo screen on the winding shaft.

10. The open roof construction according to claim 9, wherein the locking member is accommodated in a zig-zag fashion in the operating beam.

11. The open roof construction according to claim 1, wherein the elongated locking member is stationary in longitudinal direction with respect to the holding groove when within the holding groove, and wherein either the operating beam or the stationary roof part is provided with a winding pulley to accommodate the locking member when it exits the holding groove in case the operating beam is moved to wind the rollo screen on the winding shaft.

12. The open roof construction according to claim 1, wherein the locking member is stationary in longitudinal direction with respect to the holding groove when within the holding groove, but is movably attached to the stationary roof part next to the respective holding groove so as to be movable between a position within the holding groove and a position next to the holding groove, the operating beam or a part moving with it being provided with displacing means acting on the locking member to move it between both positions when the operating beam is moved to wind or unwind the rollo screen.

13. The open roof construction according to claim 1, wherein the operating beam is provided with a member to hold the respective longitudinal edge of the rollo screen when the edge area is pushed into the holding groove.

14. The open roof construction according to claim 13, the locking member is of circular or trapezium-shaped cross section.

15. The open roof construction according to claim 1, wherein the longitudinal edges of the rollo screen are each provided with a stop member to keep the respective longitudinal edge of the rob screen substantially stationary in lateral direction when the edge area is pushed into the holding groove.

16. The open roof construction according to claim 15, the stop member is at least one of a strip, cable and/or edge reinforcement.

17. The open roof construction according to claim 14, wherein the stop member is positioned substantially within the edge area of the rollo screen and includes two spaced strips such that in a closed position of the rollo screen they are positioned in the holding groove with the locking member between them.

18. The open roof construction according to claim 1, wherein the locking member is an elongated element which may be constructed as a solid steel or a twisted steel cable or wire, or a rod made of rubber-like material or plastic, such as nylon or PMMA.

19. The open roof construction according to claim 1, wherein the narrow entrance of the holding groove is on the upper or lateral side thereof.

20. The open roof construction according to claim 1, wherein the winding shaft for the rollo screen is rotatable around a stationary axis of rotation, and wherein the rollo screen, starting from the winding shaft, firstly extends in a first direction, next around a reversal member at the position of the operating beam and finally back in an opposite second direction and ends at the rollo screen edge which is attached to a stationary member of the open roof construction.

21. The open roof construction according to claim 1, wherein the longitudinal edges of the rollo screen are provided with a hook member cooperating with the locking member to hook behind the holding groove.

22. The open roof construction according to claim 10, wherein the elongate locking member is accommodated in the zig-zag fashion in the operating beam along one or more pulleys.

\* \* \* \* \*